United States Patent
Bulthuis et al.

(10) Patent No.: US 8,824,056 B2
(45) Date of Patent: Sep. 2, 2014

(54) OPTICAL DEVICE WITH REDUCED POLARIZATION SENSITIVITY

(75) Inventors: Hindrik Freerk Bulthuis, Apeldoorn (NL); Gunter B. Beelen, Edinburgh (GB)

(73) Assignee: Gemfire Corporation, San Jose, CA (US)

( * ) Notice: Subject to any disclaimer, the term of this patent is extended or adjusted under 35 U.S.C. 154(b) by 145 days.

(21) Appl. No.: 13/432,782

(22) Filed: Mar. 28, 2012

(65) Prior Publication Data

US 2012/0250160 A1 Oct. 4, 2012

Related U.S. Application Data

(60) Provisional application No. 61/468,499, filed on Mar. 28, 2011.

(51) Int. Cl.
*G02B 27/12* (2006.01)
*G02B 6/26* (2006.01)
*G02B 27/10* (2006.01)

(52) U.S. Cl.
CPC ........... *G02B 27/1013* (2013.01); *Y10S 359/90* (2013.01)
USPC .............................. 359/639; 359/900; 385/15

(58) Field of Classification Search
USPC ............................ 359/639, 900; 385/4, 11, 15
See application file for complete search history.

(56) References Cited

U.S. PATENT DOCUMENTS

| | | | |
|---|---|---|---|
| 5,544,268 A | 8/1996 | Bischel et al. | |
| 6,377,723 B1 | 4/2002 | Saito et al. | |
| 6,922,510 B2 | 7/2005 | Hatanaka | |
| 7,496,256 B2 | 2/2009 | Tsuda et al. | |
| 2005/0129363 A1 | 6/2005 | McGreer | |

FOREIGN PATENT DOCUMENTS

| | | |
|---|---|---|
| EP | 1351075 A1 | 10/2003 |
| WO | 2009038662 A2 | 3/2009 |

OTHER PUBLICATIONS

International Search Report mailed Nov. 26, 2012 in PCT/US12/30956, 10 pp.
Cotruta, D. et al., "Polarization dependent frequency shift induced BER penalty in DPSK demodulators," Proc. LEOS Annual Meeting Oct. 2009, pp. 483-484.
Heise, G. et al., "Simple Model for Polarization Sensitivity of Silica Wave guide Mach-Zehnder Interferometer," IEEE Photonics Tech. Ltrs. 17:10, pp. 2116-2118, 2005.
Nasu, Y. et al., "Asymmetric Half-Wave Plate Configuration of PLC Mach-Zehnder Interferometer for Polarization Insensitive DQPSK Demodulator," J. Lightwave Tech. 27:23, pp. 5348-5355, 2009.
Nasu, Y. et al., "Birefringence suppression of UV-induced refractive index with grooves in silica-based planar lightwave circuits," Electronics Letters 41:20, pp. 1118-1119, 2005.
Nasu, Y., et al., "Polarization-Insensitive Phase Trimming of Silica-Based Waveguide Using 193- and 244-nm UV Irradiation," J. Lightwave Technology 27:20, pp. 4563-4569, 2009.
Chen, Kr et al., "Photosensitisation of silica planar lightwave interleaver for phase error correction," Electronics Letters 38:1, pp. 24-26, 2002.

*Primary Examiner* — Jack Dinh
(74) *Attorney, Agent, or Firm* — Haynes Beffel & Wolfeld LLP; Warren S. Wolfeld

(57) ABSTRACT

Roughly described, an optical device has first and second waveguide segments which are constructed such that irradiation changes both average refractive index and also birefringence in the respective segment. The change in birefringence as a function of the change in average refractive index, is different for the two segments. Predetermined lengths of each of the two segments are irradiated. In an MZI, the technique can be used to adjust simultaneously for one or more of differential path length phase delays, coupler-induced phase errors, and frequency errors.

45 Claims, 25 Drawing Sheets

Configuration 1

Configuration 2

Configuration 3

Configuration 4

OPTICAL DEVICE WITH REDUCED POLARIZATION SENSITIVITY

Applicants hereby claim the benefit under 35 U.S.C. 119(e) of U.S. provisional application No. 61/468,499, filed 28 Mar. 2011. The provisional application is hereby incorporated by reference herein in its entirety.

BACKGROUND

1. Field of the Invention

The present invention relates generally to optical devices, and more particularly to techniques for reducing or controlling the polarization sensitivity of such devices.

2. Description of Related Art

Computer and communication systems place an ever-increasing demand upon communication link bandwidths. It is generally known that optical fibers offer a much higher bandwidth than conventional coaxial links. In conventional optical communication systems, the optical power output from a light source is intensity modulated (IM) to generate digital signals carried by the optical fiber.

Phase modulated (PM) systems can provide higher data rates and longer-distance transmission than IM based systems. In PM optical communication systems, the digital signals are generated by modifying the phase of the light. For example, optical differential phase-shift keying (DPSK) is an optical signal format in which the digital information is encoded as the phase difference between adjacent bits. In differential quadrature phase-shift keying (DQPSK) the digital information is encoded using a constellation of four points, equispaced around a circle. With four phases, DQPSK can encode two bits per symbol. Although DPSK and DQPSK can achieve higher data rates and longer-distance transmission, these signal formats can require a relatively complex receiver. Monolithic DPSK or DQPSK receivers are described for example in International Publication No. WO 2009/038662 to Doerr, incorporated herein by reference.

The differential phase between two adjacent bits can be detected in a DPSK receiver chip using a Mach-Zehnder Delay Interferometer (MZDI) in conjunction with two photodetectors. A typical MZDI includes unequal-length delay lines having a path length difference designed to be approximately one signal length of the data signal. (An MZDI is a special case of a Mach-Zehnder Interferometer (MZI), which can have equal or unequal length delay lines.) However, the delay in an MZDI is typically polarization dependent. This dependency deteriorates the accuracy by which the bits can be reconstructed by the receiver. A typical industry requirement on the polarization dependent accuracy for the phase difference in the delay of an MZDI is 3 degrees. For a DPSK data signal of around 40 Gb/s, this translates into a polarization dependent frequency shift of 0.3 GHz, which is extremely challenging in conventional MZDIs due to process variations in the current state of the art fabrication facilities. Currently, the standard deviation for the polarization dependent frequency shift in manufactured MZDIs is about 2 GHz.

SUMMARY

An opportunity therefore arises to create robust solutions to the problem of reducing or otherwise controlling polarization dependent frequency shift in optical devices such as MZIs.

Roughly described, the invention involves an MZI or other optical device having at least two segments on its waveguide(s), wherein a first one of the segments is constructed such that irradiation of the first segment changes an average of refractive indices of extraordinary and ordinary optical axes in the first segment, and also changes birefringence in the first segment, the change in birefringence being a first function of the change in average refractive index, wherein a second one of the segments is constructed such that irradiation of the second segment changes an average of refractive indices of extraordinary and ordinary optical axes in the second segment, and also changes birefringence in the second segment, the change in birefringence being a second function of the change in average refractive index, and wherein the first and second functions are different. Methods are described for irradiating various segments of the waveguides so as simultaneously to adjust or correct for polarization dependent phase shifts caused by birefringence in a differential path, polarization dependent phase shifts caused by coupler-induced birefringence, and. frequency error.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Ultraviolet (UV) illumination based trimming techniques described herein allow trimming of manufactured chips which have too large of a polarization dependent frequency error, thereby improving yield and reducing costs. The control on polarization dependent splitting is not only of relevance to DPSK and DQPSK receiver chips. It also has relevance to other devices where a Mach-Zehnder interferometer is employed. Exemplary devices where the techniques described herein can be employed include Mach-Zehnder based variable optical attenuators, interleavers, switches, polarization beam splitters, 90 degree hybrid mixer chips, etc. It also applies to other devices in which light from one path is to be interfered with light from one or more other paths, such as an Arrayed Waveguide Grating (AWG) device. In practical applications in which the wavelength of an MZI is tuned to match the signal wavelength, the entire chip temperature may be adjusted or preferably a thermooptic phase shifter may be positioned in one of the MZI arms. As those skilled in the art may readily appreciate, the thermal effect can have a very low polarization dependence and therefore can be quite good at adjusting the wavelength without affecting the polarization dependence. Instead of using an active element which requires metalization on the chip, the wavelength can alternatively or additionally be tuned by using a second UV trimming in a different MZI section as explained below.

Planar lightwave circuit (PLC) based MZIs often show a Polarization Dependent Frequency Shift (PDFS) in the transmitted spectrum.

Figure 1:
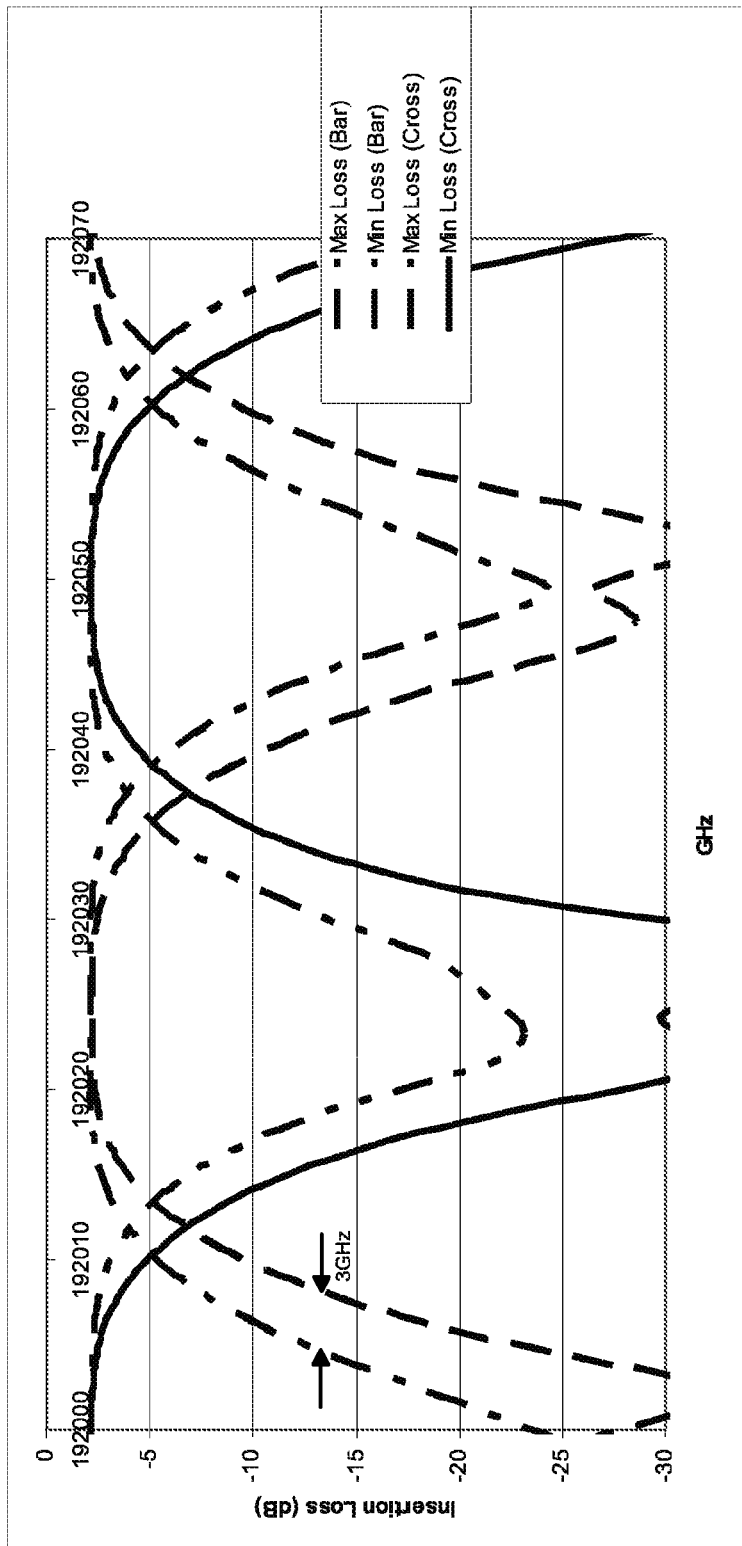
FIG. 1 is a plot illustrating the transmitted spectrum of a typical three stage interleaver.

A typical example of the transmitted spectrum is shown in FIG. 1 for a three stage interleaver consisting of three cascaded MZDIs. In FIG. 1 both the minimum and maximum transmission spectrums, over all possible polarization states, are shown. As can be seen in FIG. 1, at any transmission above about −23 dB, the two spectra are shifted with respect to each other by about 3 GHz.

In general, PDFS has a negative impact on optical performance of the device. This is true for example for the MZI based demodulation schemes which are used at the receiver side of fiber optic transmission systems, such as DPSK, QPSK and PM-QPSK. Details can be found for example, in "Polarization dependent frequency shift induced BER penalty in DPSK demodulators" by Cotruta, D., etc.; LEOS Annual Meeting Conference Proceedings, 4-8 Oct. 2009, pages 483-484, incorporated by reference herein for its teachings.

Figure 2:
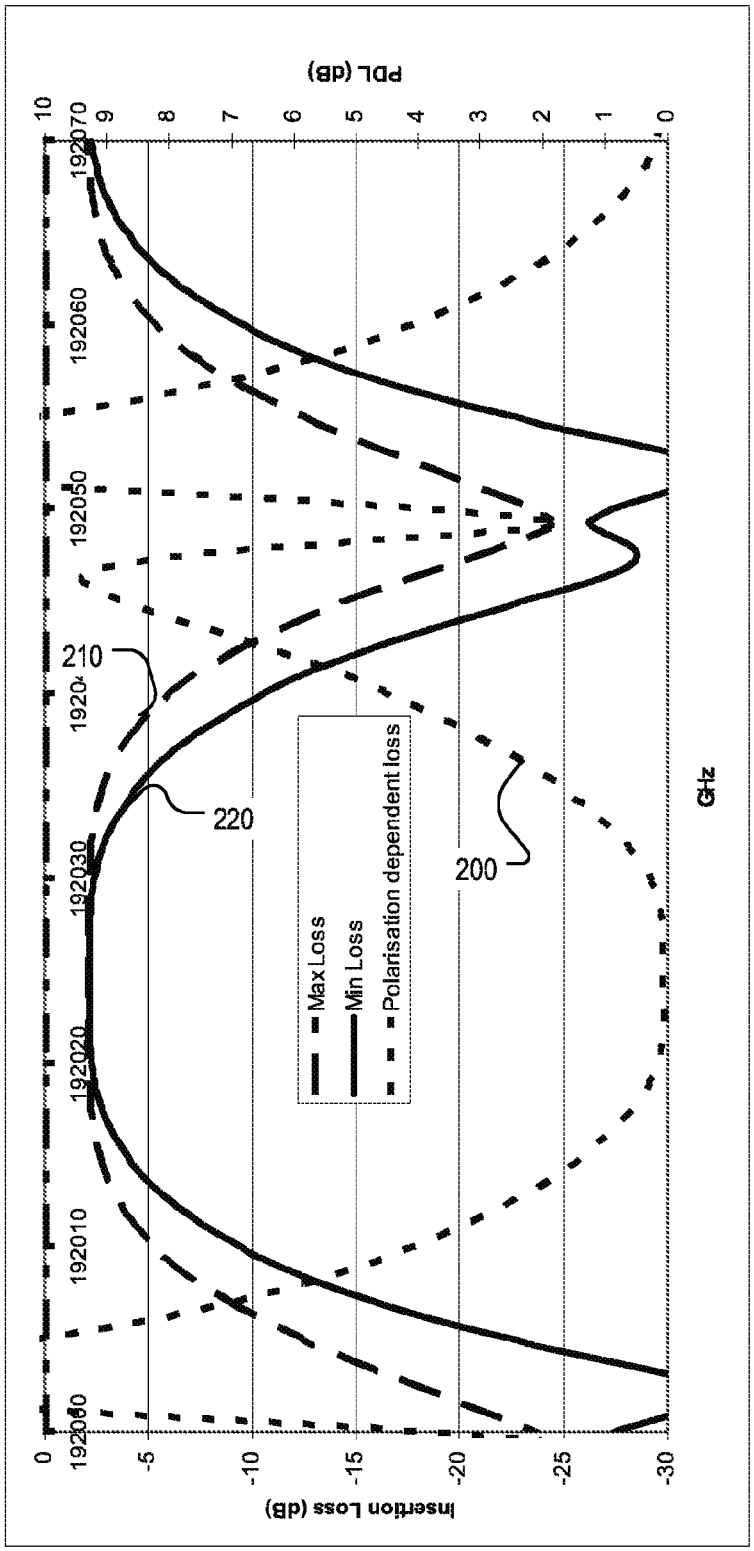
FIG. 2 is a plot illustrating polarization dependent loss and insertion loss of a typical device.

Another example of how PDFS adversely affects optical performance is shown in FIG. 2. FIG. 2 shows the maximum loss 210 and the minimum loss 220. As can be seen in FIG. 2, the Polarization Dependent Loss (PDL) 200 increases rapidly on the steep flanks of the filter curve. Minimizing the PDFS will greatly reduce this effect and thus improve performance.

Figure 3:
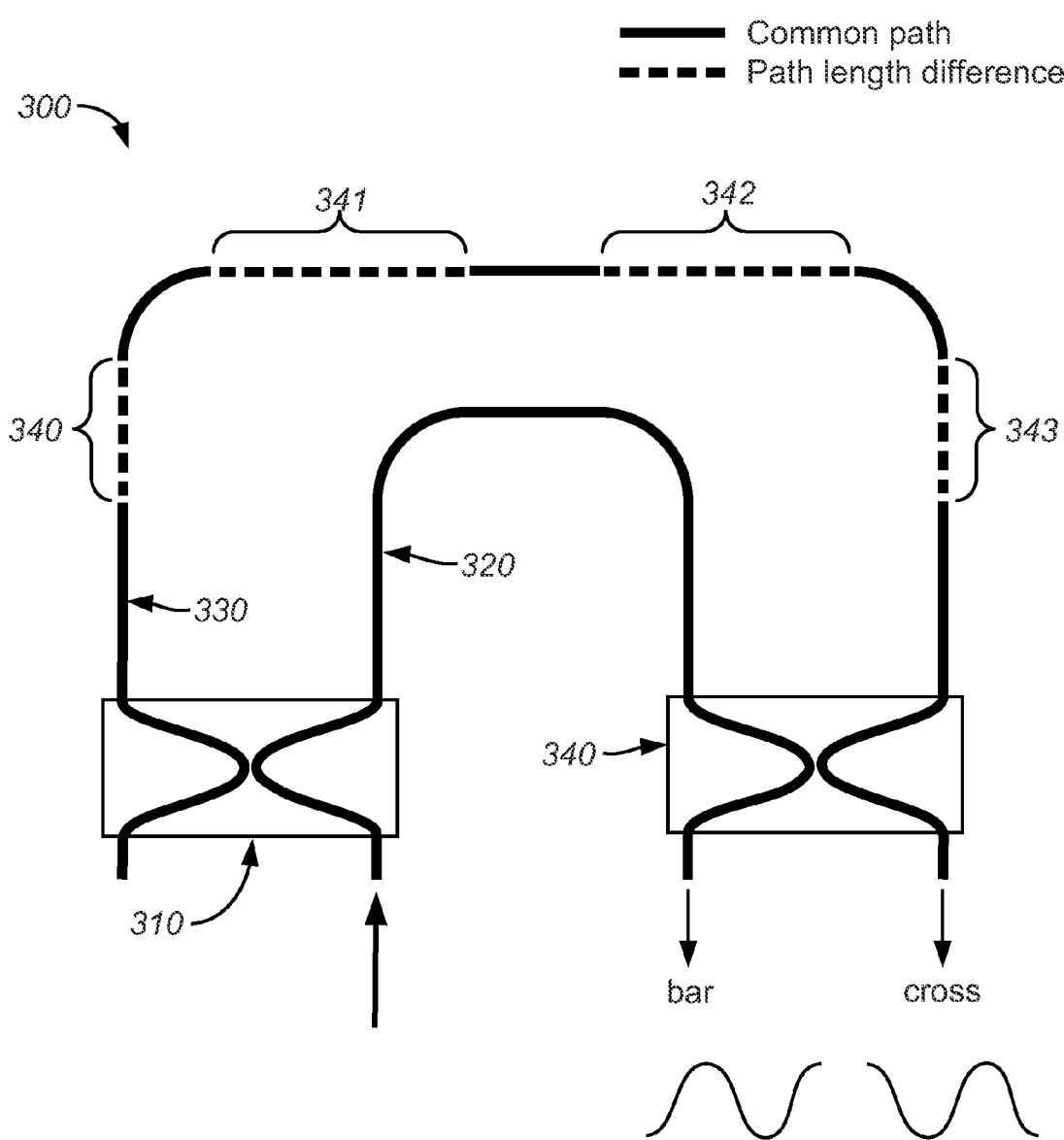
FIG. 3 illustrates a typical layout of a PLC based MZDI device.

A typical layout of a PLC based MZDI device 300 is shown in FIG. 3. The device 300 includes an optical splitter 310, a lower delay line 320, an upper delay line 330, and an optical combiner 340. The upper delay line 330 is longer than the lower delay line 320 by a path length difference $\Delta L$. The path length difference $\Delta L$ in the illustrated example is the summation of the lengths of the sections 340, 341, 342 and 343 of the upper delay line 330. The other (non-labeled) sections of the upper delay line 330 have a path length equal to that of the lower delay line 320. The path length of the lower delay line 320 is referred to herein as the common path length L. The delay lines are also sometimes referred to herein interchangeably as arms, branches or paths. The splitter 310 and the combiner 340 are both 3 dB directional couplers in FIG. 3, but any other type of component which splits an incoming beam can be used for splitter 310, and any other type of component which combines to incoming beams to present one or more outputs can be used for combiner. In an AWG embodiment, for example, the splitter and combiner can each constitute a star coupler.

All of the devices shown and described herein preferably are disposed on a single substrate, preferably rigid, preferably forming a planar light circuit (PLC). In addition, the terms "upper" and "lower" do not necessarily refer to the physical positions of the branches on a real device. On a real device, it does not matter which branch is considered the "upper" branch and which the "lower". Rather, the terms should be considered merely names for the two paths provided so they can be referred to consistently. Thus, for example, as used herein the "common path length" is the length of whichever branch is shorter, and the "path length difference" is the difference in length between whichever branch is longer and whichever branch is shorter.

Figure 4:
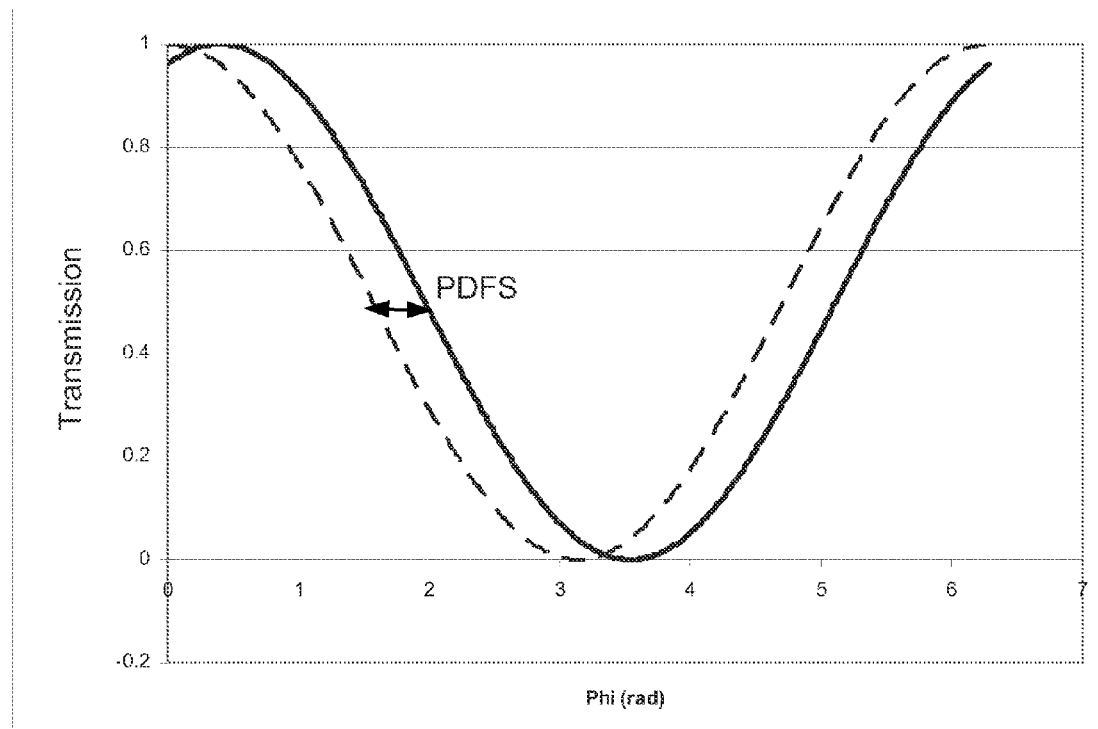
FIG. 4 is a plot illustrating polarization dependency of delay in a typical MZDI device.

A typical frequency response of an MZDI is shown in FIG. 4. Transmitted power is plotted as a function of the relative phase difference $\phi$ between upper delay line 330 and the lower delay line 320.

Conventionally, the relative phase difference $\phi$ is often expressed mathematically as:

$$\phi = \frac{2\pi\nu}{c} \cdot n \cdot \Delta L \qquad \text{(Eq. 1)}$$

where $\nu$ is the frequency, n is the average effective refractive index of the waveguide, and c is the speed of light in vacuum. In the discussion herein, the sign of the path length difference is considered positive when the "upper" optical path is longer and negative when the "lower" optical path is longer. More generally, where the index of refraction can vary in different waveguides or different portions of one waveguide as described elsewhere herein:

$$\phi = \frac{2\pi c}{\nu} \left[ \sum n_{upper} l_{upper} - \sum n_{lower} l_{lower} \right]$$

for all the portions of the upper and lower waveguides. As used herein, relative phase is defined as the phase delay in the upper branch of the MZI minus the phase delay in the lower branch.

As described above, delay in an MZDI is typically polarization dependent. This polarization dependency can be seen in the spectrum of FIG. 4, where the two curves represent the transmitted power for light with ordinary polarization and extraordinary polarization, relative to plane of substrate, respectively. The amount by which these two curves are translated horizontally with respect to each other is the PDFS.

The PDFS is defined as PDFS=$\phi_{TM}-\phi_{TE}$, where TM polarized relative phase difference is for TM polarized light having its main electrical component along the extraordinary axis, perpendicular to the plane of the substrate, and TE polarized light having its main electrical component along the ordinary axis, in the plane of the substrate. This shift is the polarization dependent frequency shift. In the illustrated example of FIG. 4, the PDFS=0.8 radians. In the following discussion, the PDFS, as well as the frequency error FE defined later, is expressed in radians unless otherwise stated. To convert to frequency from radians, the PDFS, or any other frequency error in radians, is multiplied by the Free Space Spectral Range (FSR) divided by $2\pi$.

In general PLC waveguides fabricated in glass technology are, at least to some degree, birefringent. This is due to the high temperatures at which the core and cladding glass are deposited. Different dopant levels in the core and cladding create different thermal expansion properties for each material. Hence, upon cooling, stress is induced in the different materials constituting the waveguide.

The birefringence magnitude B can be expressed mathematically as:

$$B = n_e - n_o \qquad \text{(Eq. 2)}$$

where the subscripts e and o denote the respective refractive indices of the extraordinary and ordinary optical axes. These axes are perpendicular to each other in a plane normal to the direction of propagation of the light in the waveguide. Typically, and as the terms are used herein, the ordinary axis is defined as being parallel to the plane of the wafer. This is true for both narrow isolated waveguides as shown for example in FIG. 5, and wide (or slab) isolated waveguides as shown for example in FIG. 6. This is also true for waveguides that are surrounded by other waveguide structures placed symmetrically at either side, as shown for example in FIG. 7.

Figure 5:
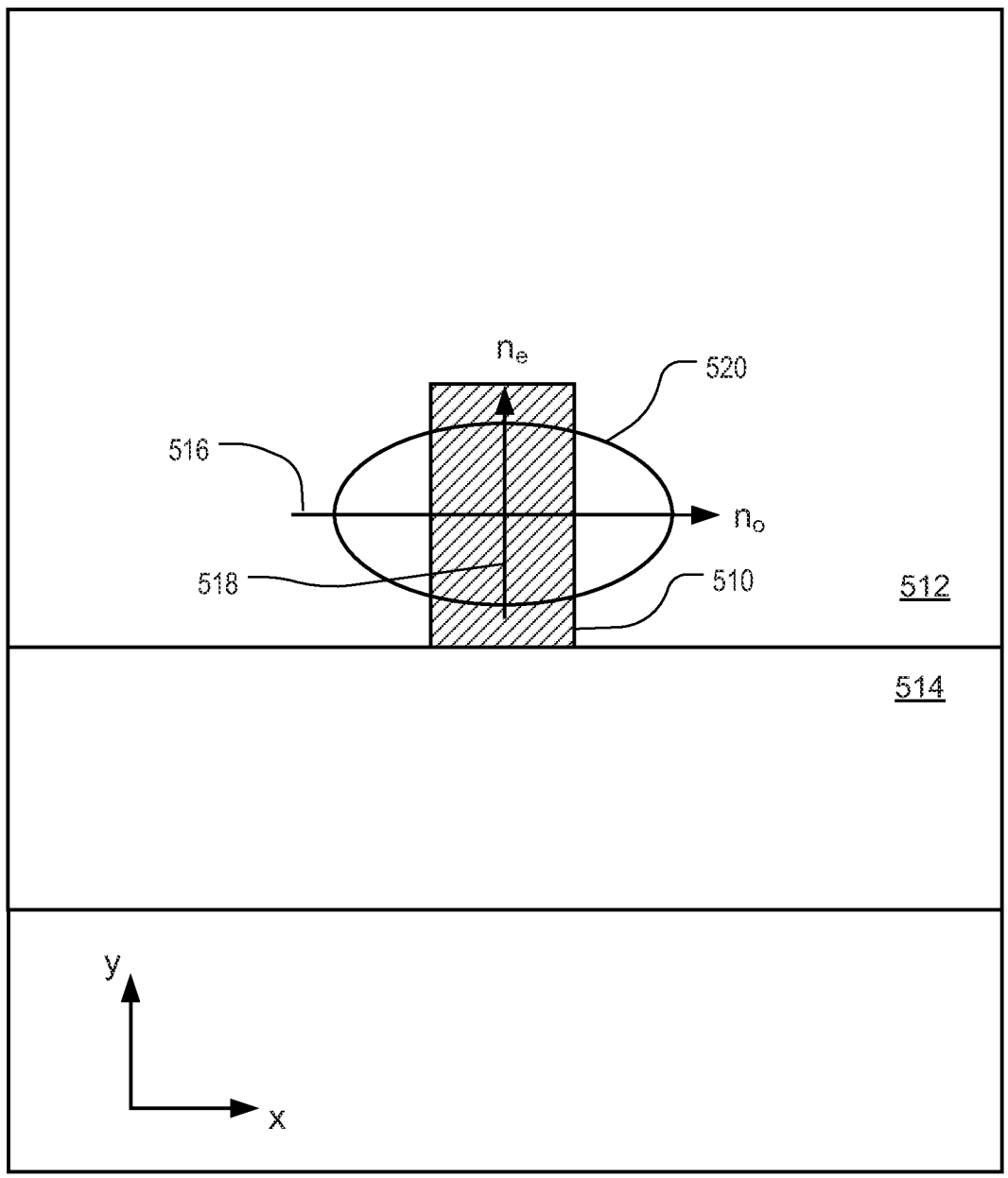
FIGS. 5-7 illustrate birefringence in waveguides of several geometries.

In FIG. 5 the waveguide core is 510 and the cladding is made up of region 512 and "underclad" region 514. The core is considered herein to be "narrow" because it is taller than it is wide. The ordinary and extraordinary axes 516 and 518 are also shown. The beam propagation direction (optical axis) is perpendicular to the page, and the ellipse 520 represents roughly the shape of the index profile. That is, at each angular position around the center point the radius of the ellipse 520 at that angle determines the index for light polarized at that angle. It can be seen that the ellipse 520 is elongated transversely, resulting in negative birefringence ($n_e < n_o$).

Figure 6:
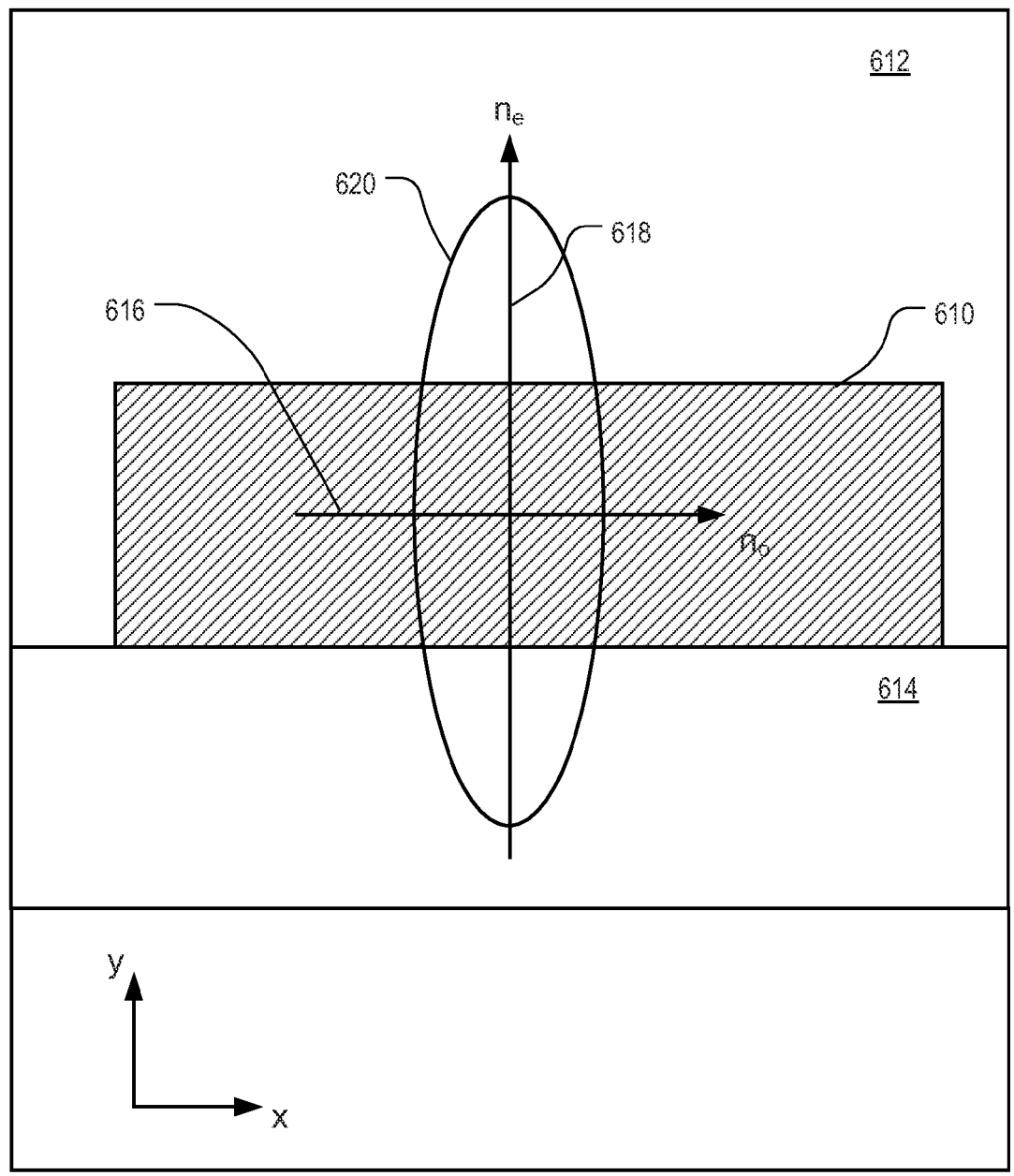

In FIG. 6 the waveguide core is 610 and the cladding is made up of region 612 and underclad region 614. The core is considered herein to be "wide" because it is wider than it is tall. Slab waveguides typically also meet this definition of "wide". The ordinary and extraordinary axes 616 and 618 are also shown, as is an ellipse 620 representing the index profile. It can be seen that the index profile 620 is elongated vertically, resulting in positive birefringence ($n_o < n_e$).

Figure 7:
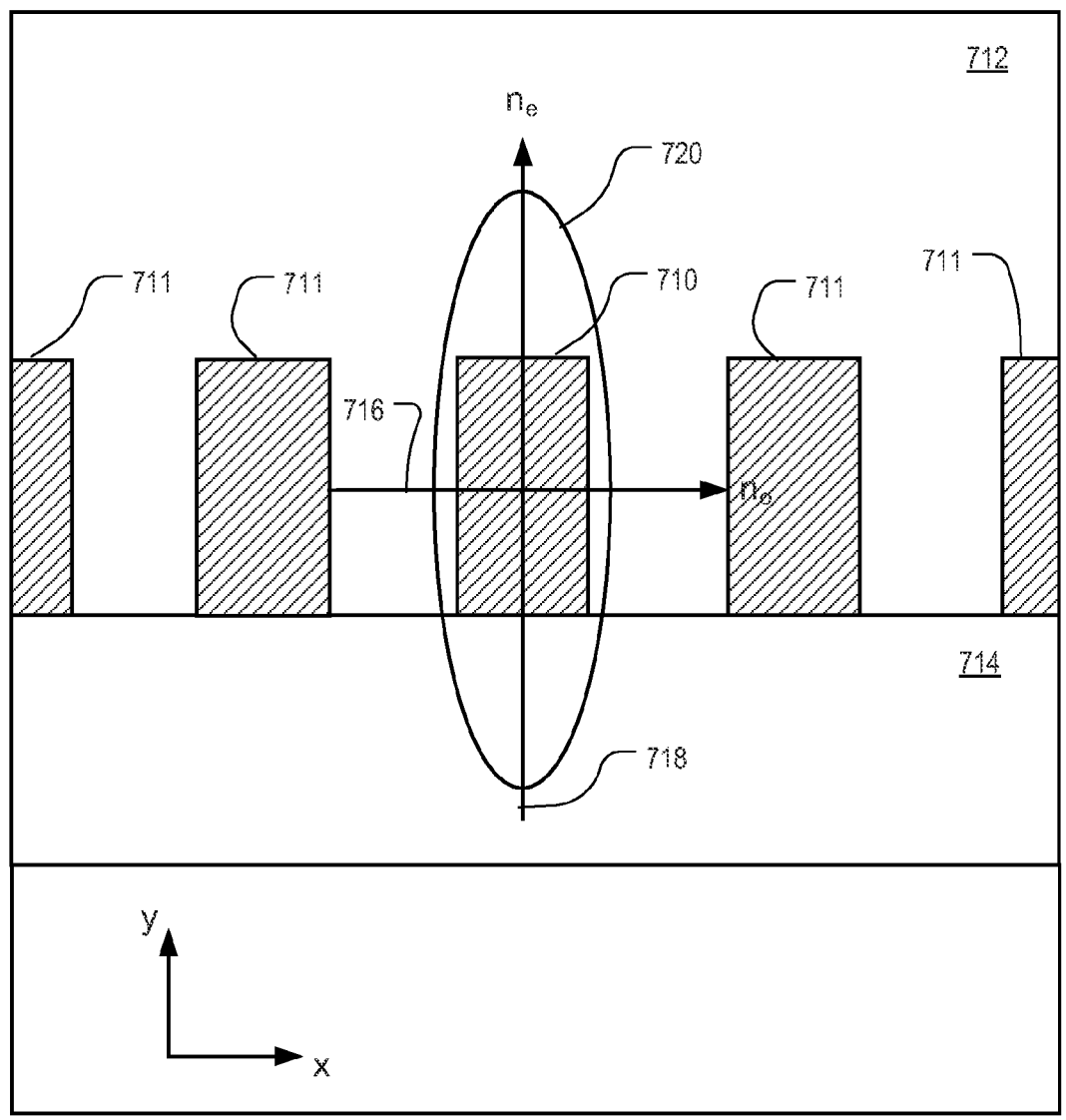

In FIG. 7, a waveguide core is 710 and the cladding is made up of region 712 and underclad region 714. Additional waveguide cores 711 are symmetrically placed nearby on either side of core 710 and affect the stress oriented transversely in the waveguide 710. The ellipse 720 represents the index profile for waveguide core 710. It can be seen that the index profile 720 is elongated vertically in FIG. 7 despite the narrow shape of the core 710, resulting in positive birefringence ($n_o < n_e$).

The birefringence created by the stress of the material can be approximated as $$B = n_e - n_o = C(\sigma_x - \sigma_y) \qquad \text{(Eq. 3)}$$

where $\sigma_x$ is the stress in the ordinary dimension, $\sigma_y$ is the stress in the extraordinary dimension, and C is a constant of proportionality. C in some embodiments is equal to about $-3.6 \times 10^{-6}$ MPa$^{-1}$. For waveguides on a silicon wafer, typically a compressive stress is achieved which can be as high as $-200$ MPa for the undercladding such as 514, 614 and 714. The core regions 510, 610, 710 and cladding regions 512, 612, 712 have higher doping which reduce the compressive stress to lower levels. For a plane strain situation, $\sigma_y$ is approximately zero, and compressive stress, $\sigma_x$ is less than or equal to zero, which results in positive birefringence. In order to achieve negative birefringence the waveguide typically has to be isolated to allow for additional compressive stress in the y-direction.

Referring back to the device 300 illustrated in FIG. 3, the lower delay line 320 and the upper delay line 330 are isolated waveguides. The birefringence B of the waveguides 320, 330 is over the common path length L and over the path length difference ΔL.

The birefringence over the path length difference ΔL introduces a small phase delay γ between the TE and TM polarizations. TE (transverse electric) polarized light has its main electrical component along the x-coordinate. TM (transverse magnetic) polarized light has its main electrical component along the y-coordinate. So, TE light propagating in the waveguide sees the ordinary index, whereas TM light is seeing the extraordinary index.

This phase delay γ, or path length difference, between TE and TM light is the path length difference for the two polarization states expressed in radians. In the absence of polarization rotation (discussed below), and assuming birefringence B is constant everywhere, it can be given mathematically by the following:

$$PDFSd = \gamma = \frac{2\pi}{\lambda} \cdot B \cdot \Delta L \qquad \text{(Eq. 4)}$$

More generally, where the index of refraction can vary in different waveguides or different portions of one waveguide as described elsewhere herein:

$$PDFSd = \phi_{TM} - \phi_{TE},$$

$$\text{where } \phi_{TE} = \frac{2\pi}{\lambda} \Big[ \sum n_{TE,upper} l_{upper} - \sum n_{TE,lower} l_{lower} \Big]$$

$$\text{and } \phi_{TM} = \frac{2\pi}{\lambda} \Big[ \sum n_{TM,upper} l_{upper} - \sum n_{TM,lower} l_{lower} \Big]$$

for all the portions of the upper and lower waveguides.

The subscript 'd' on PDFS in (Eq. 4) is meant to indicate that this is a phase delay developed over the path length "difference" rather than by any birefringence developed over the common path length L. Birefringence over the common path length L does not cause any PDFS, since this birefringence is common to both the lower and upper delay lines 320, 330. However, the situation changes in the presence of polarization rotation in the directional couplers 310, 340. In this case light enters the delay line with its axes of polarization at an angle with respect to the axes of birefringence. Polarization beating occurs. In addition, the polarization state before entering combiner 340 is different from what it was when the light left the splitter 310. This leads to a different component of PDFS, which we will call PDFSc to indicate "coupler-induced" PDFS. In the absence of PDFSd, it can be shown that for a small angle of rotation ρ, the coupler induced PDFSc is approximately equal to $$PDFSc = 8\rho \cdot \sin\left(\frac{\delta}{2}\right) \qquad \text{(Eq. 5)}$$

where $$\delta = \frac{2\pi}{\lambda} \cdot B \cdot L \qquad \text{(Eq. 6)}$$

PDFSc becomes zero when δ equals an integer multiple of 2π. When this happens light enters the combiner 340 with the same state of polarization as it left the splitter 310.

The polarization rotation is caused by a slight tilting of the birefringence axes. See, "Simple Model for Polarization Sensitivity of Silica Waveguide Mach-Zehnder Interferometer," by G. Heise, et al., IEEE Photonics Technology Letters, Vol. 17, No. 10, October 2005, pp. 2116-2118, incorporated by reference herein for its teachings.

This tilt can cause the polarization of the outgoing light to rotate by a small angle ρ. Measured results have shown a rotation angle of about 1 to 3 degrees. In the case of a splitter or combiner implemented as a directional coupler, the inventors have theorized that the tilting of the birefringence axes may be caused by the asymmetric geometry of the coupler (only one neighboring waveguide) combined with material stresses. See, also, "Simple Model for Polarization Sensitivity of Silica Waveguide Mach-Zehnder Interferometer," by G. Heise, et al.; and "Asymmetric Half-Wave Plate Configuration of PLC Mach-Zehnder Interferometer for Polarization Insensitive DQPSK Demodulator," by Y. Nasu, et al., Journal of Lightwave Technology, Vol. 27, No. 23, Dec. 1, 2009, pp. 5348-5355, both incorporated by reference herein for their teachings.

In the discussion above, PDFSd and PDFSc were discussed individually. However, the combination of both effects results in the total PDFS for the device. Jones matrices can be constructed for the lower delay line 320, $J_{lower}$, and for the upper delay line 330, $J_{upper}$. The total PDFS is then calculated using the following equation (See, "Asymmetric Half-Wave Plate Configuration of PLC Mach-Zehnder Interferometer for Polarization Insensitive DQPSK Demodulator," by Y. Nasu, et al., referenced above):

$$PDFS = 2\cos^{-1}\left(Tr\left[\frac{1}{2}|(J_{lower})^* \cdot J_{upper}|\right]\right) \quad \text{(Eq. 7)}$$

For a small rotation angle ρ, the approximate total PDFS can be expressed mathematically as:

$$PDFS = 2\cos^{-1}\left(4\cos\left(\frac{\gamma}{2}+\delta\right)\rho^2 + (1-4\rho^2)\cos\left(\frac{\gamma}{2}\right)\right) \quad \text{(Eq. 8)}$$

Note that for zero birefringence over ΔL (i.e. for γ=0), the total PDFS given by (Eq. 8) reduces to the expression in (Eq. 5). In the absence of polarization rotation or birefringence over common path length L (i.e. for ρ=0), the total PDFS given by (Eq. 8) reduces to the expression given by the expression in (Eq. 4).

Figure 8:
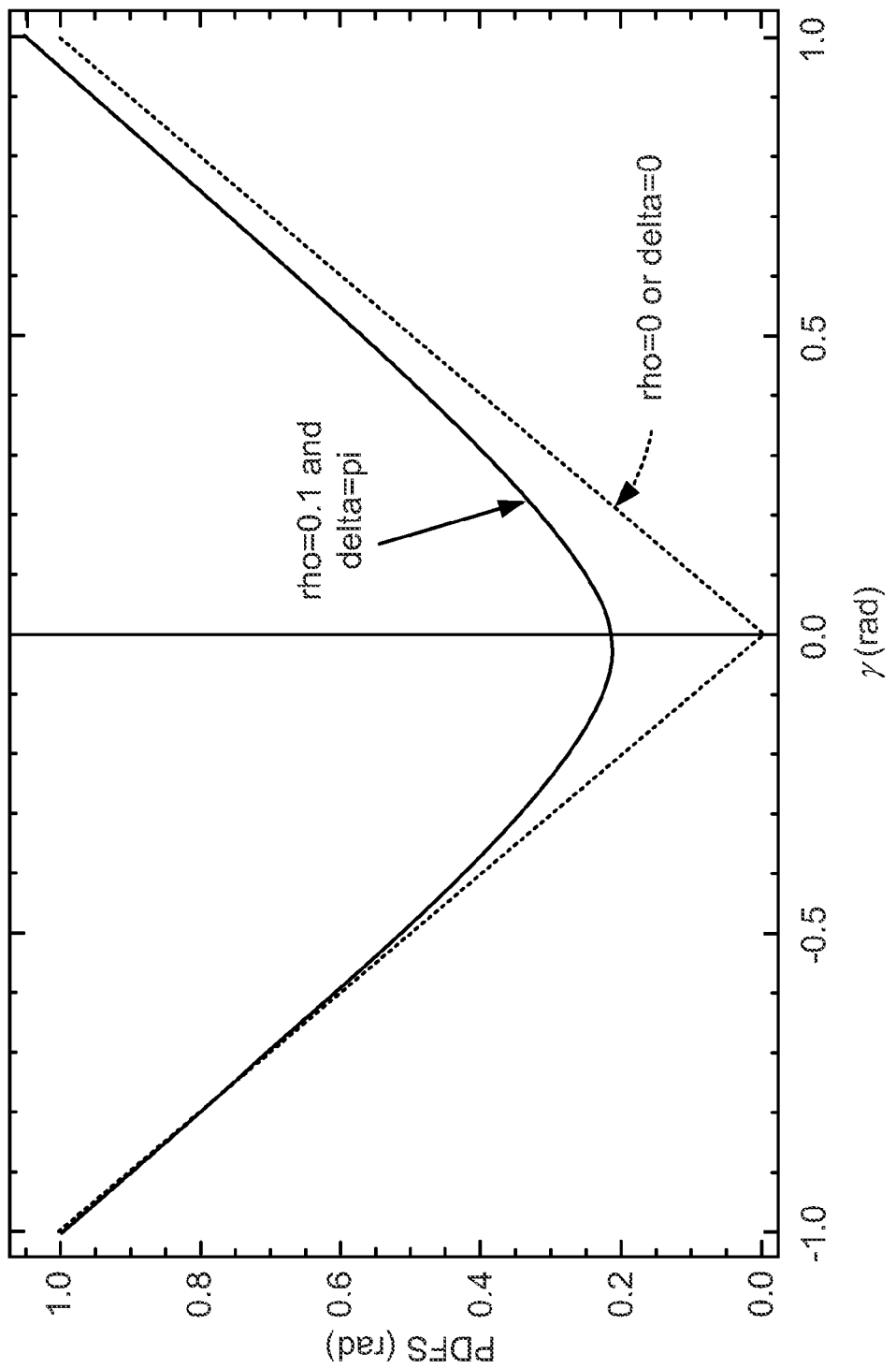
FIG. 8 is a plot of PDFS as a function of γ.

See also FIG. 8. FIG. 8 is a graph of the PDFS as a function of γ. For γ=0 the PDFS is nonzero in the presence of polarization rotation (ρ=0.1) and birefringence over the common path length (δ=π). In FIG. 8, the ρ is labeled as 'rho', δ is 'delta', and π is 'pi'.

For small δ and γ, (Eq. 8) reduces to:

$$PDFS = \sqrt{\gamma^2 + 16\rho^2\delta^2 + 16\rho^2\delta\gamma} \quad \text{(Eq. 9)}$$

A similar expression applies to the situation for δ near integer multiples of 2π. The expression in (Eq. 9) can be rewritten in the following forms which illustrate the asymptotic behavior:

$$PDFS = 4\rho\delta\sqrt{1 + \frac{\gamma}{\delta} + \left(\frac{\gamma}{\rho\delta}\right)^2} \quad \text{(Eq. 10)}$$

$$PDFS = \gamma\sqrt{1 + \left(1+\frac{\gamma}{\delta}\right)\left(\frac{4\rho\delta}{\gamma}\right)^2} \quad \text{(Eq. 11)}$$

For the regime where the PDFS is mainly caused by rotation, γ<<δ and (Eq. 10) reduces to 4ρδ. This applies for example to the situation of a symmetric MZI, or any MZI where the common path length L is much larger than the differential path length ΔL. In a situation where the polarization rotation of the coupler is negligible, γ>>4ρδ, the PDFS converges to γ. This follows from (Eq. 11).

The UV trimming techniques described herein relate to trimming of γ and δ. Trimming of γ adjusts PDFSd whereas trimming of δ adjusts PDFSc.

Frequency Errors

The operation frequency (OF) is by definition the frequency at which the phase difference between the two delay lines of the MZDI is equal to an integer multiple of 2π. Due to variations in the fabrication processes, the OF is typically offset from its design target (target frequency, or TF). In the context of this discussion we define the frequency error in radians and it can be defined as $$FE = \phi_{operation} - \phi_{target}.$$

The UV trimming techniques described herein provide for the simultaneous independent trimming of PDFS and FE.

Figure 9:
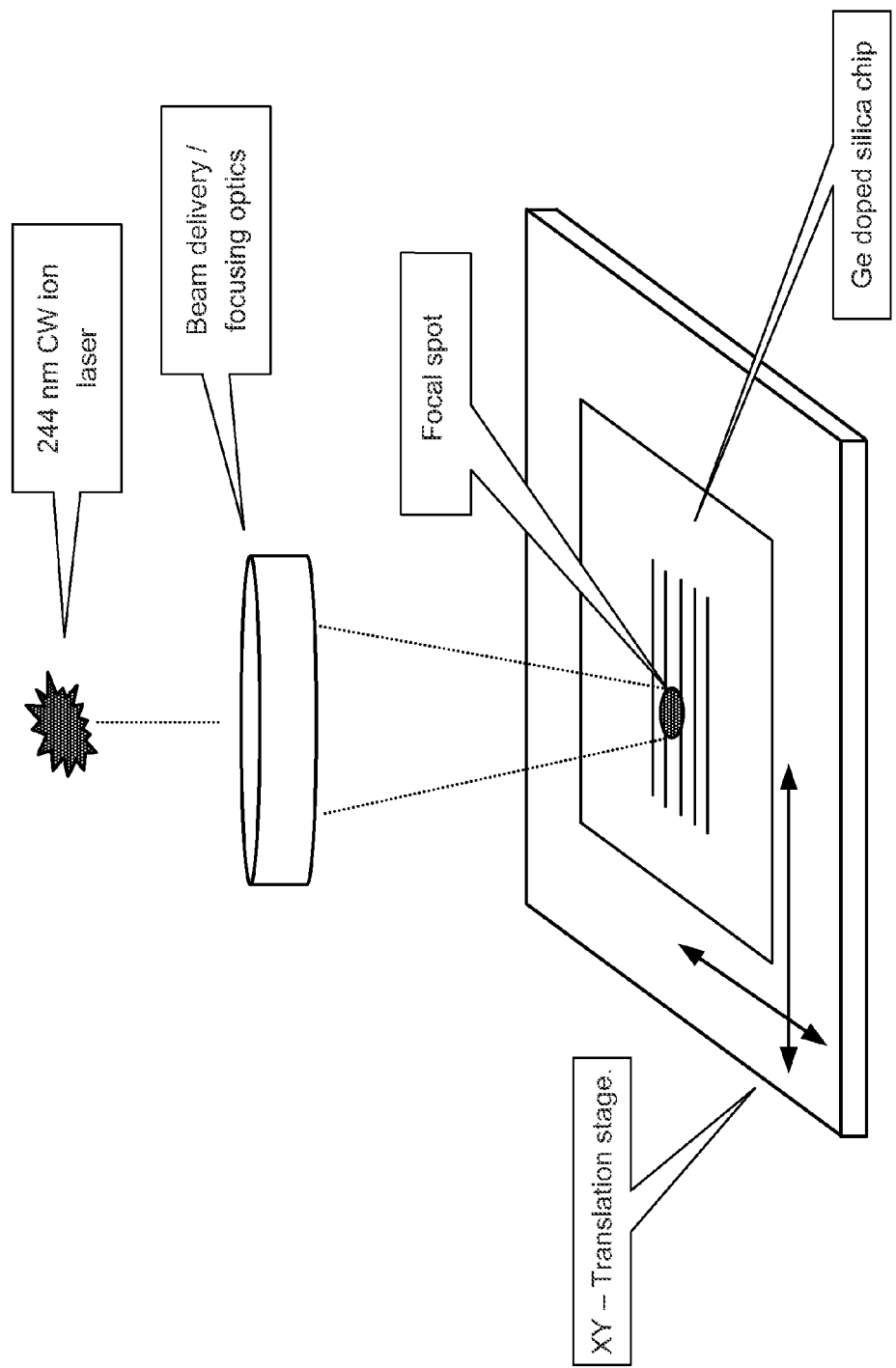
FIG. 9 illustrates a schematic layout of a UV laser trimming setup for performing the techniques described herein.

A schematic layout of an exemplary UV laser trimming setup for performing the techniques described herein is illustrated in FIG. 9. In this example, writing occurs on silica-on-silicon chips with germanium doped waveguide core. Prior to writing, chips are loaded with hydrogen at 120 bar pressure for 72 hours. A 244 nm CW ion laser is used, and focused spot size equals 20 μm. The writing speed is from 300 to 1000 μm/s. It will be understood that the setup and process parameters utilized to perform the UV trimming techniques described herein can vary from embodiment to embodiment. In addition, other embodiments can use illumination wavelengths other than UV, or more generally can use forms of irradiation other than illumination. As used herein, "illumination" is considered a special case of "irradiation".

Trimming for PDFS and FE

Frequency errors can be eliminated or otherwise adjusted by writing a UV pattern of a certain length in the upper or the lower branch of the MZI. For a negative relative phase correction, the UV pattern is written in the lower arm; positive corrections are achieved by writing in the upper arm. The relation between the relative phase difference correction and the length of the UV pattern can be expressed mathematically as:

$$\Delta\phi = h_1 \frac{2\pi}{\lambda}\Delta n, \quad \text{(Eq. 12)}$$

where Δn is the refractive index change induced by the writing process, $h_1$ is the length of the UV pattern written, λ is the wavelength of light being considered. In the following discussion, a wavelength of 1.55 μm is assumed wherever numeric examples are provided. In (Eq. 12), Δφ is the change in phase which corresponds with the frequency correction. An is a function of the irradiation setup, and includes such characteristics as irradiation type, wavelength, fluence, writing speed, and so on, as well as the receptivity of the device to index changes as a result of the irradiation setup. In one embodiment of waveguide technology and laser setup, Δn is equal to 0.004. It should be noted that Δϕ is expressed in radians and is converted to frequency by multiplication with the free spectral range divided by 2π. That is:

$$\text{sign}(\phi)\Delta v = \Delta\phi \frac{FSR}{2\pi} = \frac{h_1 \Delta n FSR}{\lambda},$$

where Δv is the change in OF and FSR is the free spectral range of the device.

Rearranging Eq. 12 yields the following equation describing the length $h_1$ of the irradiation to be applied in one arm in order to achieve a frequency correction of Δϕ using an irradiation setup which changes the index of the waveguide by Δn wherever it is applied.

$$h_1 = \frac{\lambda \Delta\phi}{2\pi \Delta n} \quad \text{(Eq. 12.1)}$$

Thus to achieve zero frequency error, one would choose Δϕ=−FE, where FE is the frequency error in radians prior to correction. For purposes of Equations 12 and 12.1, again as before, the signs are defined so that for $h_1$<0, the UV pattern of length $|h_1|$ is written in the lower arm. For $h_1$>0, the UV pattern of length $h_1$ is written in the upper arm. The above assumes, as in prior art, that UV trimming does not change the PDFSd. This is true only if the induced index Δn is identical for the extraordinary and ordinary axis. That is generally not the case as explained in the following section, and rather than writing a single segment of length $h_1$, one would instead write in two segments to achieve zero FE and zero PDFSd simultaneously.

Birefringence Change Induced by UV Trimming

It has been observed that UV writing in a waveguide not only changes its refractive index, but also changes its birefringence. If Δn is the average of the refractive index change for the ordinary and extraordinary axes (Δn=(Δn$_o$+Δn$_e$)/2), then the birefringence for a given change in the average refractive index change can be written as:

$$\Delta B = q \cdot \Delta n, \quad \text{(Eq. 13)}$$

where q is a factor of proportionality.

This birefringence change can be used to advantage because the magnitude of the induced birefringence depends on the geometry of the waveguide the correction pattern was applied to. For example, for waveguides with a 4 μm wide square cross section the factor of proportionality may equal q=−0.03; whereas for 4 μm thick slab waveguides and the same irradiation characteristics, the factor may equal q=−0.10.

Figure 10:
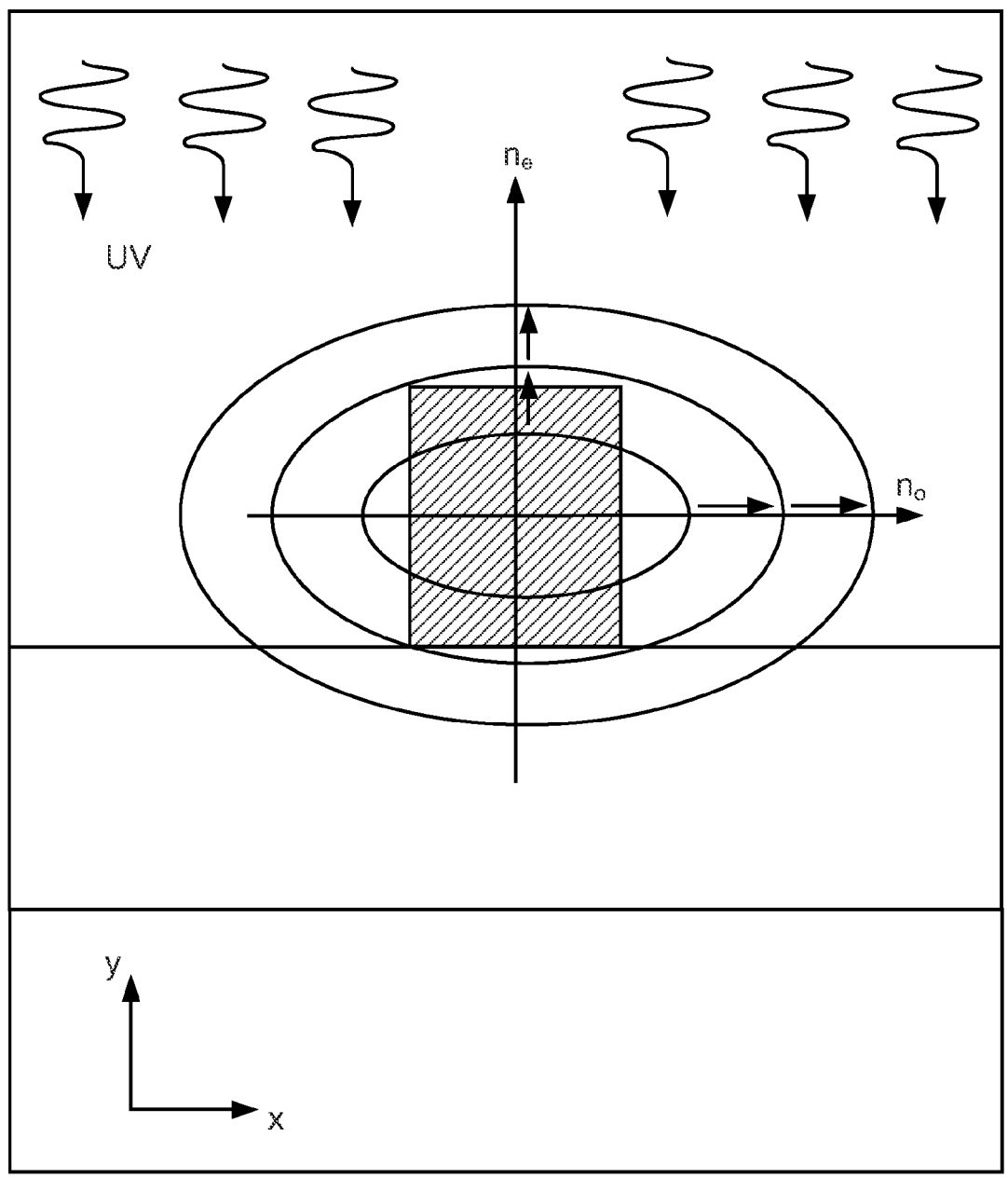
FIGS. 10 and 11 illustrate effects of UV trimming on birefringence in waveguides of two geometries.
Figure 11:
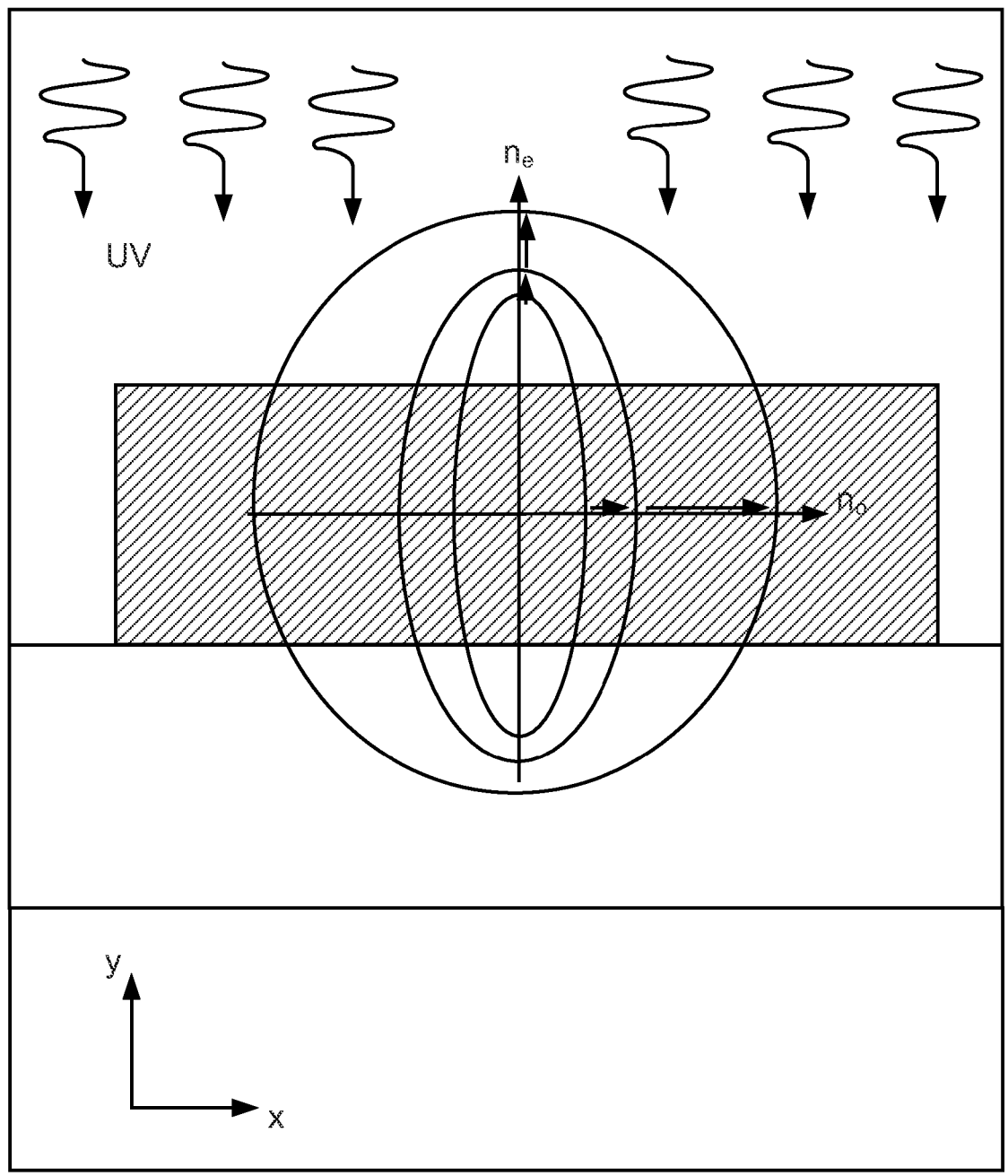

FIG. 10 is an illustration of an example UV writing of a narrow isolated waveguide which results in almost equal increases in both the ordinary index and the extra-ordinary index. In this example q is roughly equal to zero. FIG. 11 is an illustration of an example UV writing of a dense or slab waveguide which results in a larger increase for the ordinary index than for the extra-ordinary index. In this example q is significantly negative.

Figure 12:
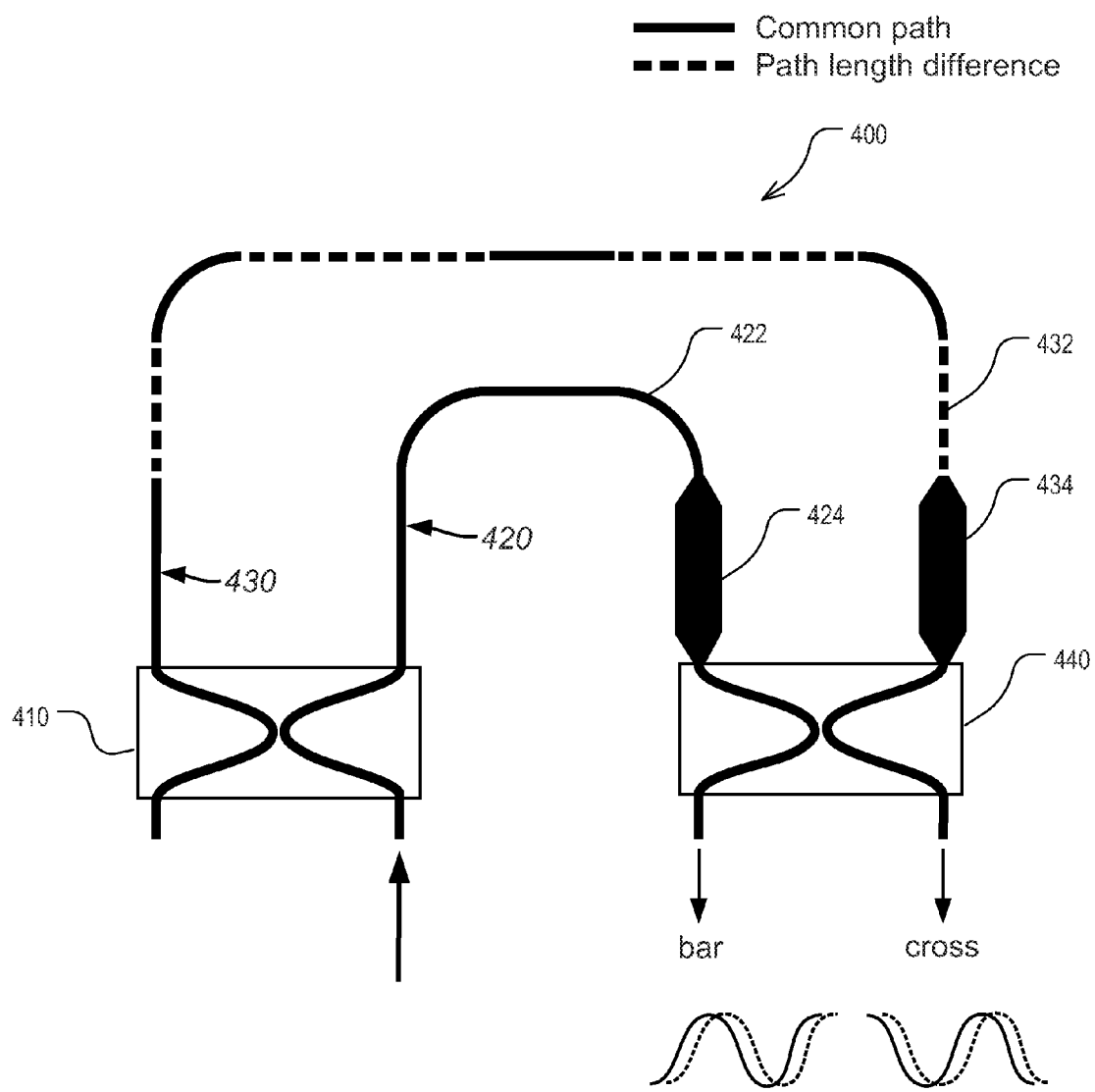
FIGS. 12-20, 23 and 24 illustrate a layout of an optical device incorporating features of the invention, showing various UV writing embodiments.

Embodiments of the invention can take advantage of different values of q in order to correct for PDFS and frequency errors simultaneously by combining positive and negative frequency corrections in narrow and wide waveguide sections (or sections having otherwise dissimilar geometries or birefringence irradiation dependencies). An example of a MZDI based device 400 with a lower delay line 420 and an upper delay line 430, which each include narrow and wide waveguide segments, is shown in FIG. 12. At an input end of MZDI 400 the two paths 420 and 430 receive light from respective outputs of a splitter 410, and at an output end they provide light to respective outputs of a combiner 440. The narrow and wide waveguide segments in the lower path 420 are identified as 422 and 424, respectively, and the narrow and wide waveguide segments in the upper path 430 are identified as 432 and 434, respectively. While the drawings herein show the wider waveguide segments adjacent to the combiner 440, it will be appreciated that many other variations are possible. For example, either or both can be placed away from combiner 440, at related or unrelated positions within the two paths, within straight or curved segments, or even split into multiple noncontiguous portions of a path.

In other embodiments, rather than utilizing narrow and wide waveguide cores to obtain the dissimilar geometries, other methods for providing different stress in the two waveguide segments may be implemented. This can be accomplished for example by geometric differences other than waveguide width, such as by replacing the wide waveguide segment with a narrow waveguide segment and providing dummy waveguides or etched slots on either side. Alternatively, different stress-inducing films can be applied above or below the different waveguide segments. In yet another embodiment, the two waveguide segments have no physical difference, but rather the irradiation method for the segments can differ. For example, irradiation of different wavelengths can be used in the two segments, or irradiation of the same wavelength but different fluences, or irradiation of the same wavelength and fluence but different writing speeds, can all produce a different value of q in the two segments. Hybrid combinations of all the above approaches and others also can be used for producing a different value of q in the two segments. The description below uses wider and narrower waveguide cores to produce different values of q in the two segments, but it will be understood that any other method to produce different values of q can be used additionally or instead.

As used herein, an "irradiation" has a set of writing characteristics and is performed over some length of a waveguide or waveguide segment. This length may in some embodiments be split into more than one non-contiguous portion. A set of "writing characteristics", as the term is used herein, includes substantially the same type of irradiation, irradiation wavelength, fluence, writing speed, and receptivity of the waveguide to such irradiation (but not writing length). As used herein, if two irradiations differ in any one of those features, they are considered to have different "writing characteristics".

UV Trimming of the Common Path

As described above, PDFS is caused by two effects. The first is related to polarization rotation and birefringence in the common path length (PDFSc); the second is associated with birefringence in the differential path length (PDFSd). This section discusses the elimination of PDFSc.

PDFSc is linked to the parameters ρ and δ introduced above. It follows from (Eq. 8) that the PDFSc can be eliminated if δ can be made equal to an integer multiple of 2π:

$$\delta = \pm i \cdot 2\pi \quad \text{(Eq. 14)}$$

for i=0, 1, 2, 3 . . . .

Figure 13:
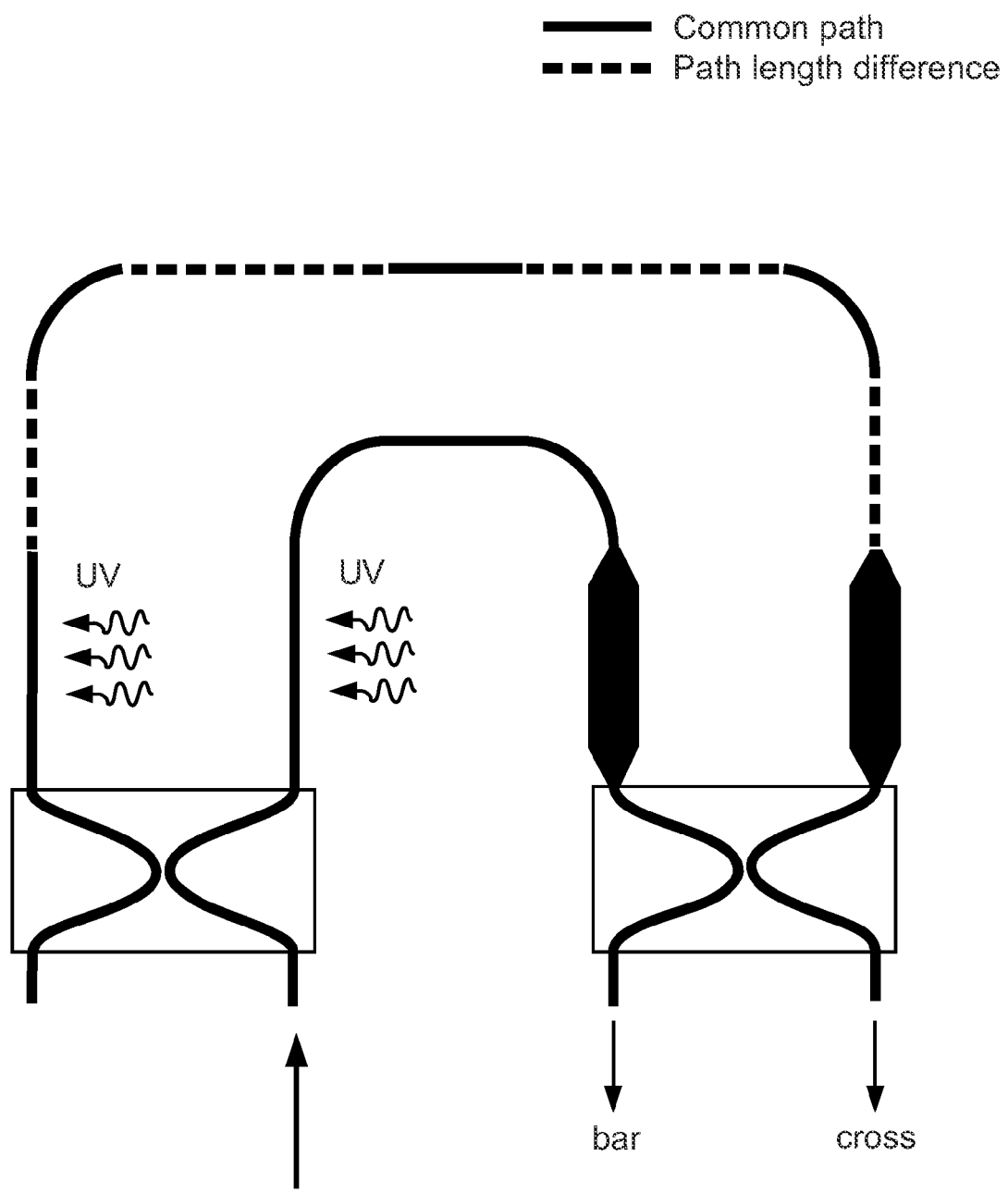
Figure 14:
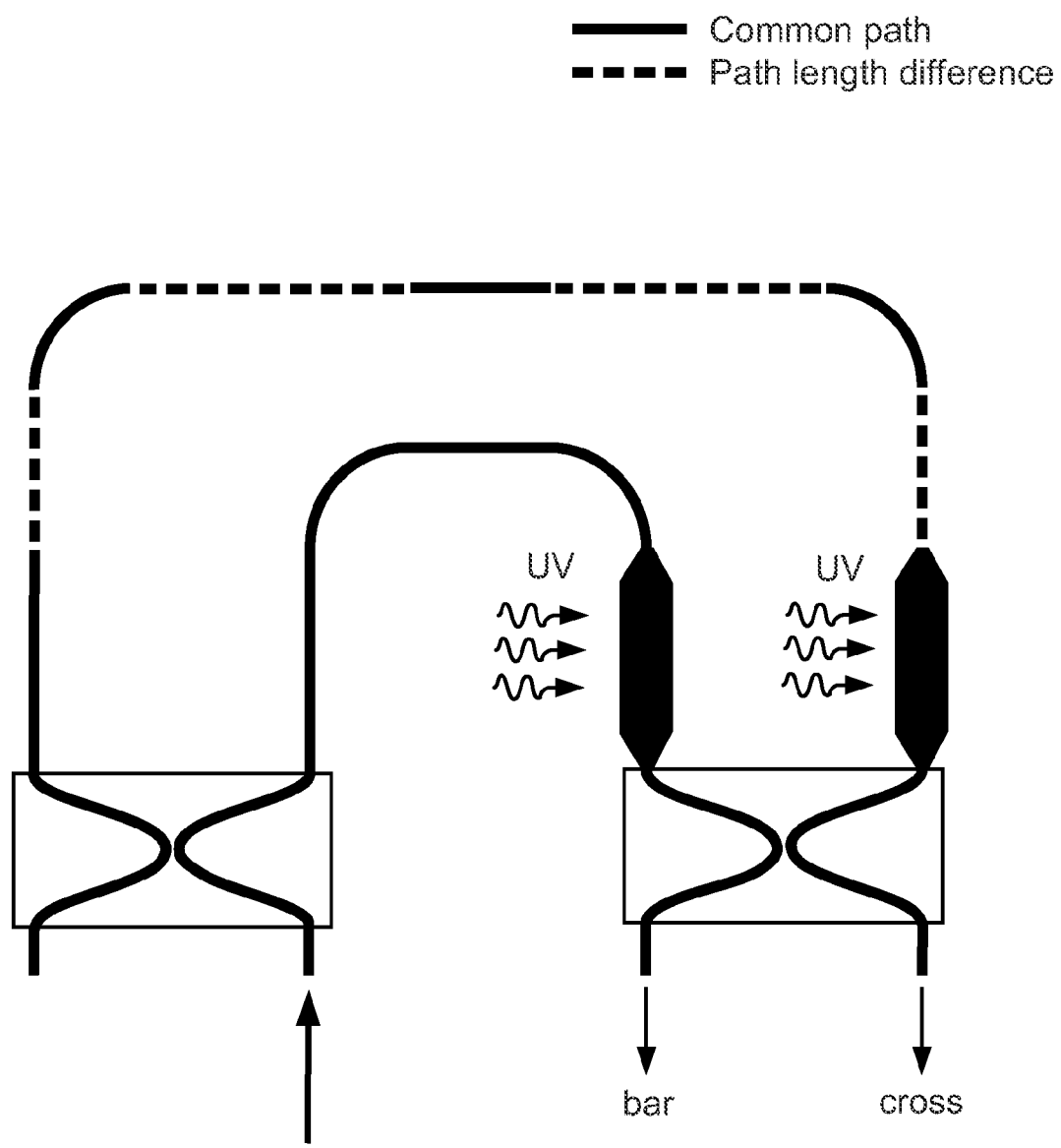

This is achieved by writing a UV pattern of length $h_2$ in both delay lines of the MZI in waveguides with identical geometry. FIG. 13 is an illustration of an example UV writing in the narrow waveguide section of both waveguides. FIG. 14 is an illustration of an example UV writing in wide waveguide sections of both waveguides. FIGS. 13 and 14 are symbolic, with each wavy arrow representing the writing of some constant length within the path segment (wide or narrow) pointed to by the arrow. In FIGS. 13 and 14, the same writing length (indicated by three arrows) is applied in both arms of the MZI. Note that there will be no effect on the frequency error, because the trim is applied to both delay lines in equal measure.

From (Eq. 4) it follows that the trim length $h_2$ required for zero PDFSc can be calculated with the following formula:

$$h_2 = -\frac{\delta - 2i\pi}{\Delta B} \cdot \frac{\lambda}{2\pi}, \quad\text{(Eq. 15)}$$
$$\text{where } \delta = \frac{2\pi}{\lambda} B \cdot L,$$

where B is the waveguide birefringence where the trimming will occur, prior to such trimming,
where L is the common path length,
and where i is any integer that yields $h_2 >= 0$.

Example 1

Positive Waveguide Birefingence

Assume the waveguide birefringence is $B=3.0\times10^{-5}$, $\lambda=1.55$ μm, the polarization rotation is $\rho=3$ degrees and the common path length $L=5000$ μm. Then $\delta=0.61$ and the PDFSc=0.126 ($\gamma=0$).

The required trim length to reduce the PDFSc to zero then, using $q=-0.03$ and $\Delta n=4\times10^{-3}$, is $h_2=1250$ μm when trimming in the narrow waveguides, or using $q=-0.1$ and $\Delta n=4\times10^{-3}$, is $h_2=375$ μm when trimming in the wide waveguides.

Example 2

Negative Waveguide Birefingence

Assume the waveguide birefringence is $B=-1.0\times10^{-4}$, the polarization rotation is $\rho=3$ degrees and the common path length $L=5000$ μm. Then $\delta=-2.033$ and the PDFSc=−0.356 ($\gamma=0$).

The required trim length to reduce the PDFSc to zero is then $h_2=8708$ μm when trimming in narrow waveguides, or $h_2=2612$ μm when trimming in the wide waveguides.

Because correction of PDFSc involves writing of equal lengths $h_2$ in both paths, it has no effect on frequency error. Thus to both correct for PDFSc and adjust for FE simultaneously, one can write a UV pattern of length $h_2$ in one arm and a UV pattern of length $h_2+|h_1|$ in the other arm. Again, if $h_1<0$, the UV pattern of length $h_2+|h_1|$ is written in the lower arm. For $h_1>0$, the UV pattern of length $h_2+|h_1|$ is written in the upper arm. It should be noted that UV pattern $h_1$ introduces additional PDFSd which may or may not need to be compensated. It is explained how this can be achieved in the following section. Also it should be noted that UV pattern $h_1$ can be written in a segment different from the segment where UV pattern $h_2$ is written.

UV Trimming of the Differential Path

In this section the elimination of PDFS due to birefringence in the differential path (PDFSd) will be treated.

Figure 15:
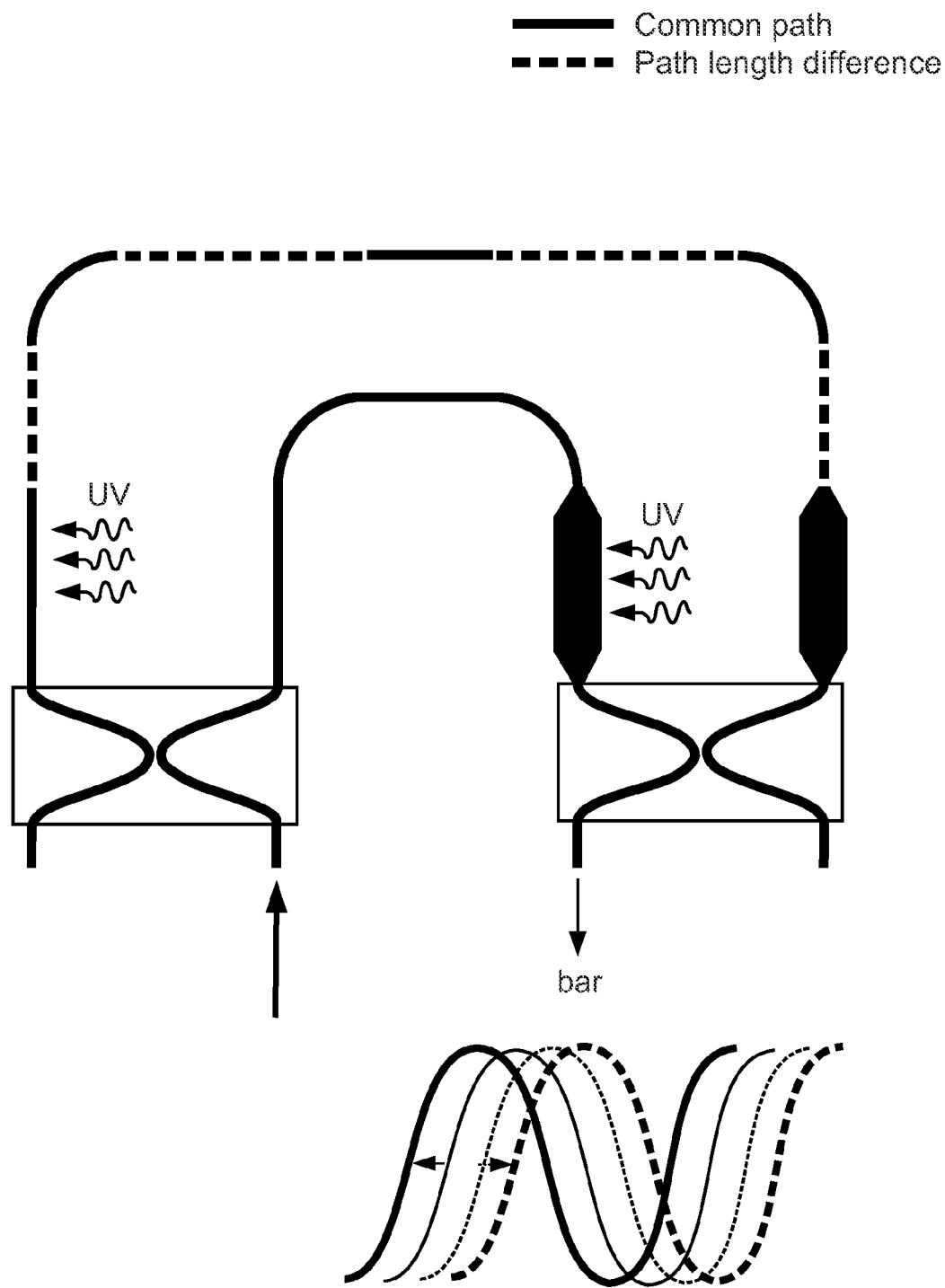
Figure 16:
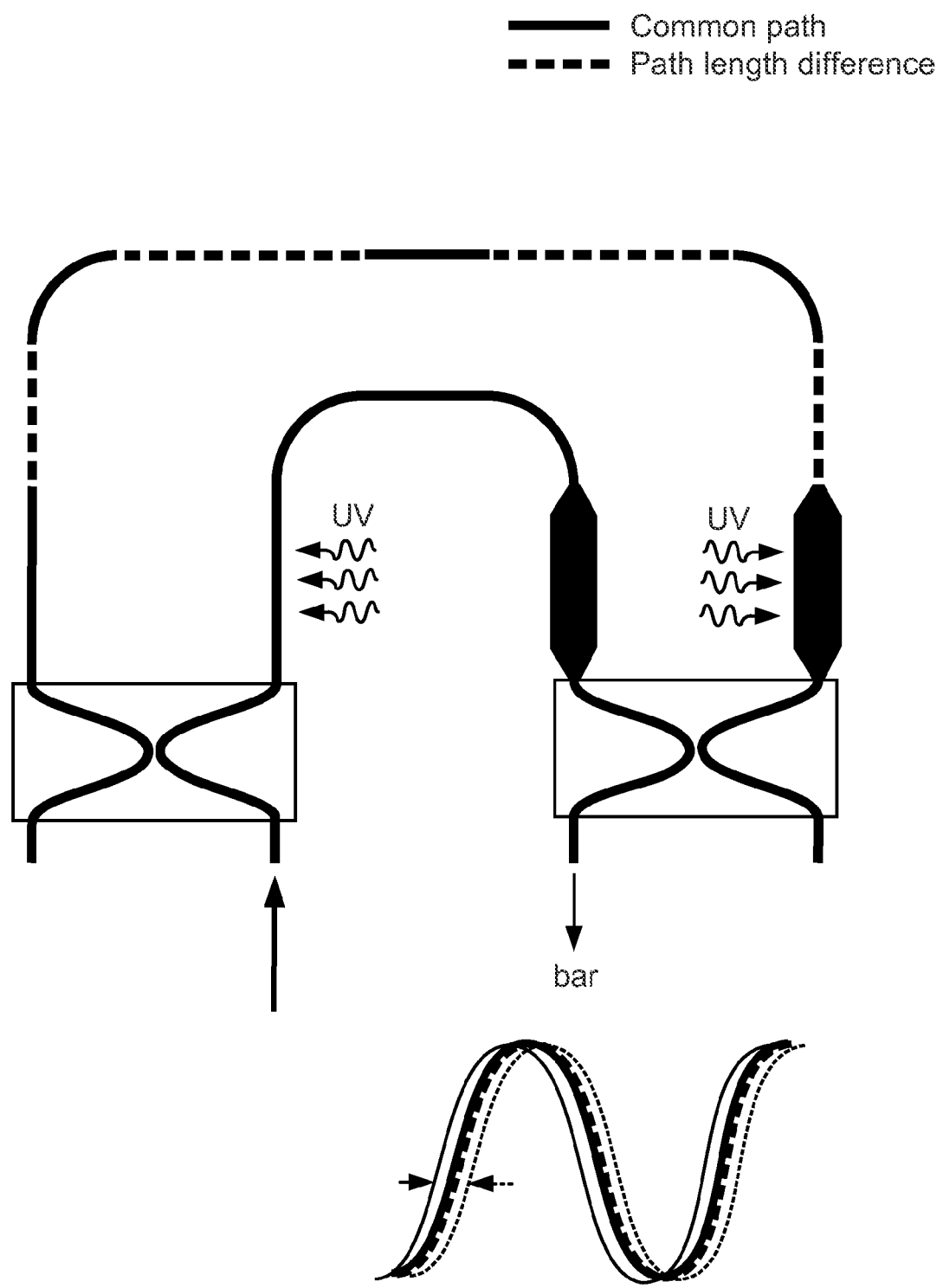
Figure 17:
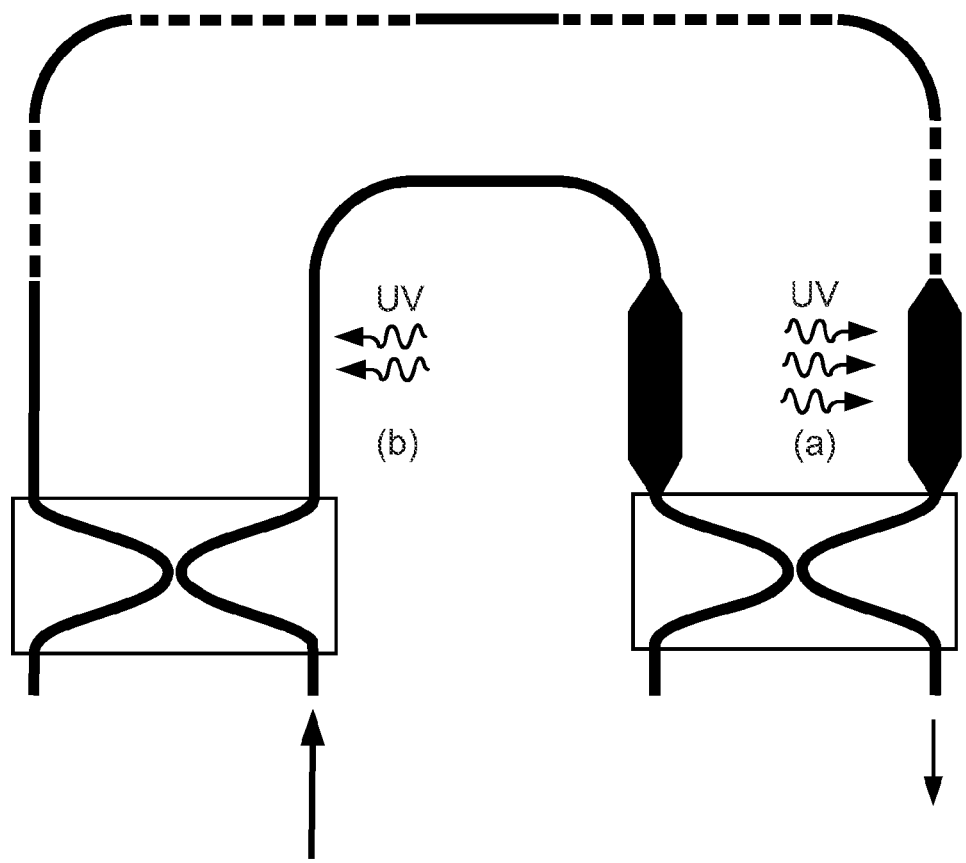
Figure 18:
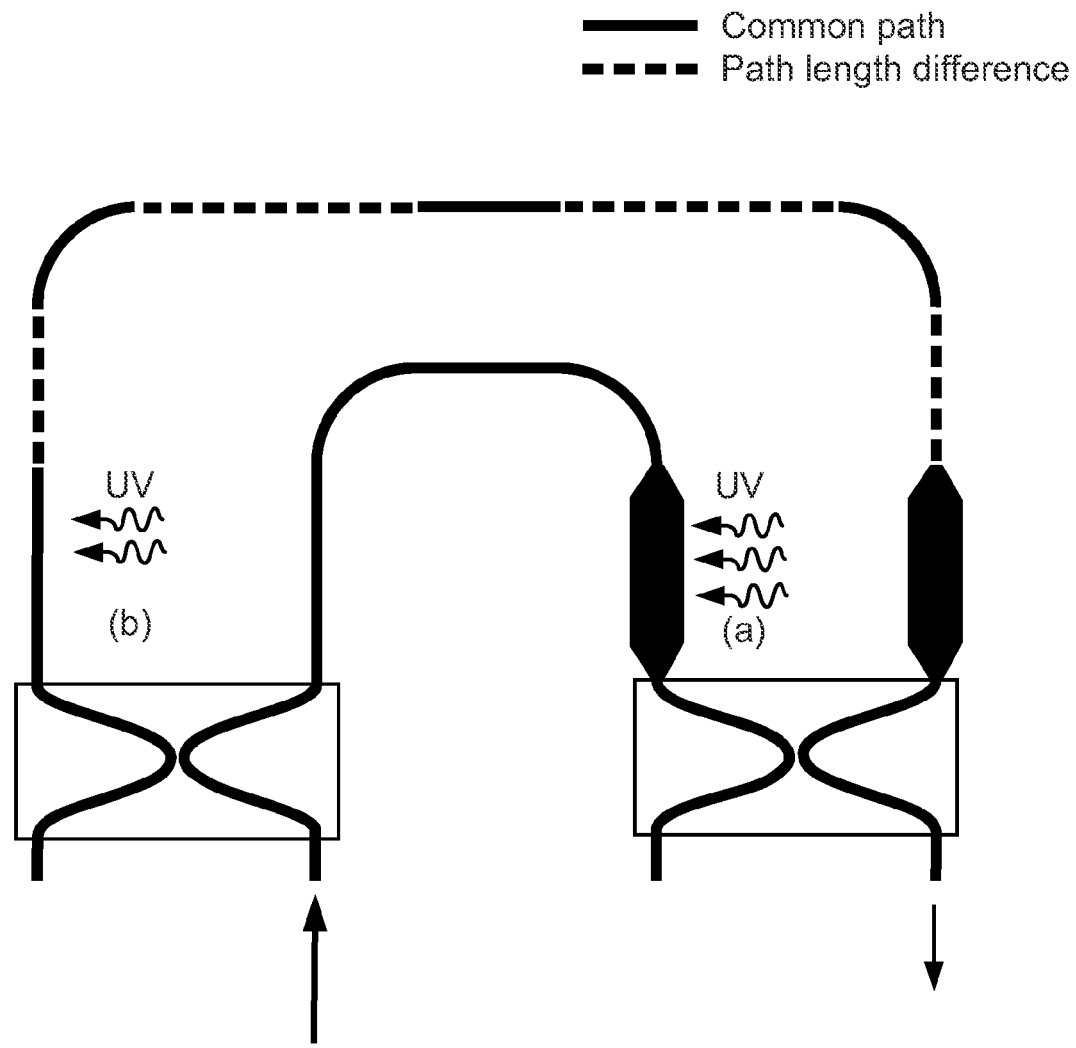
Figure 19:
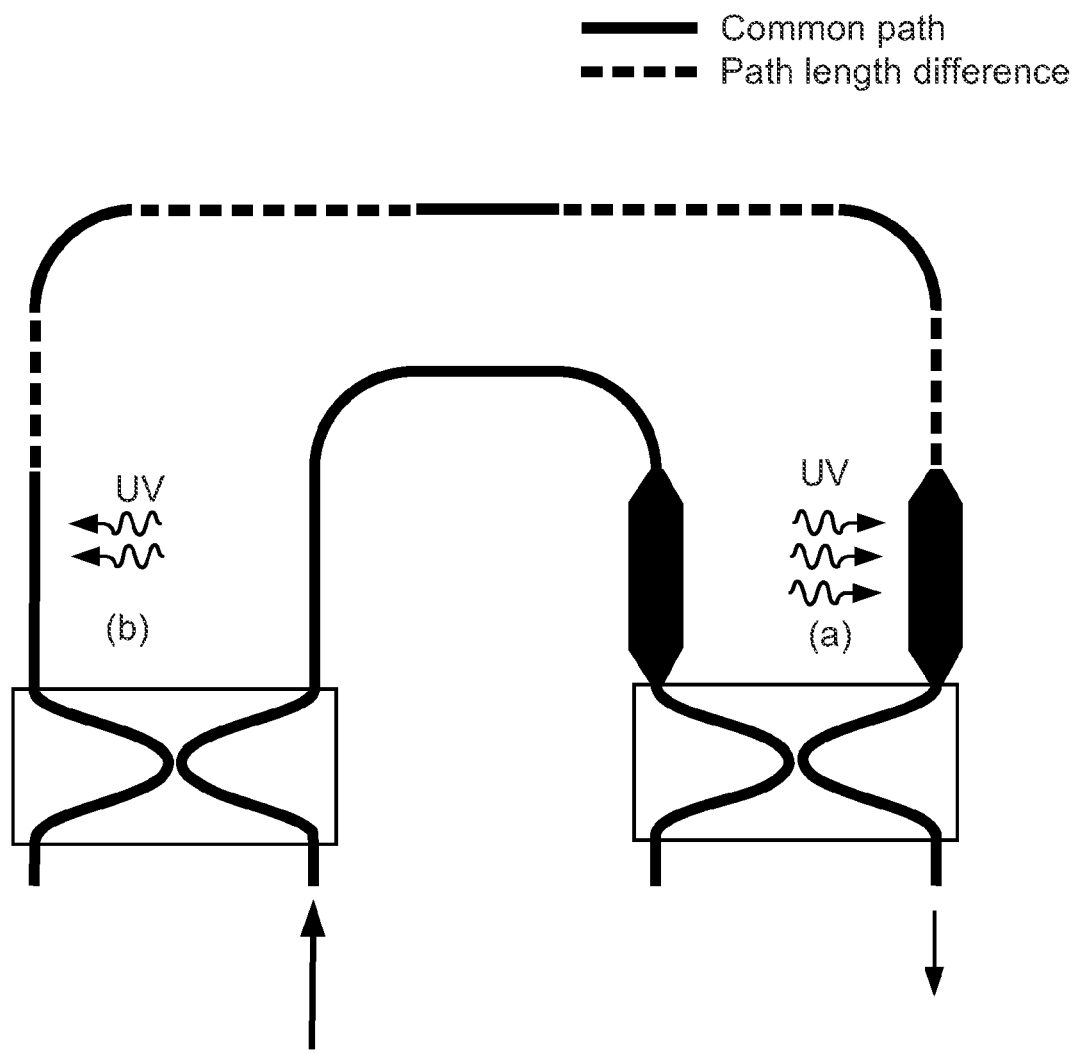
Figure 20:
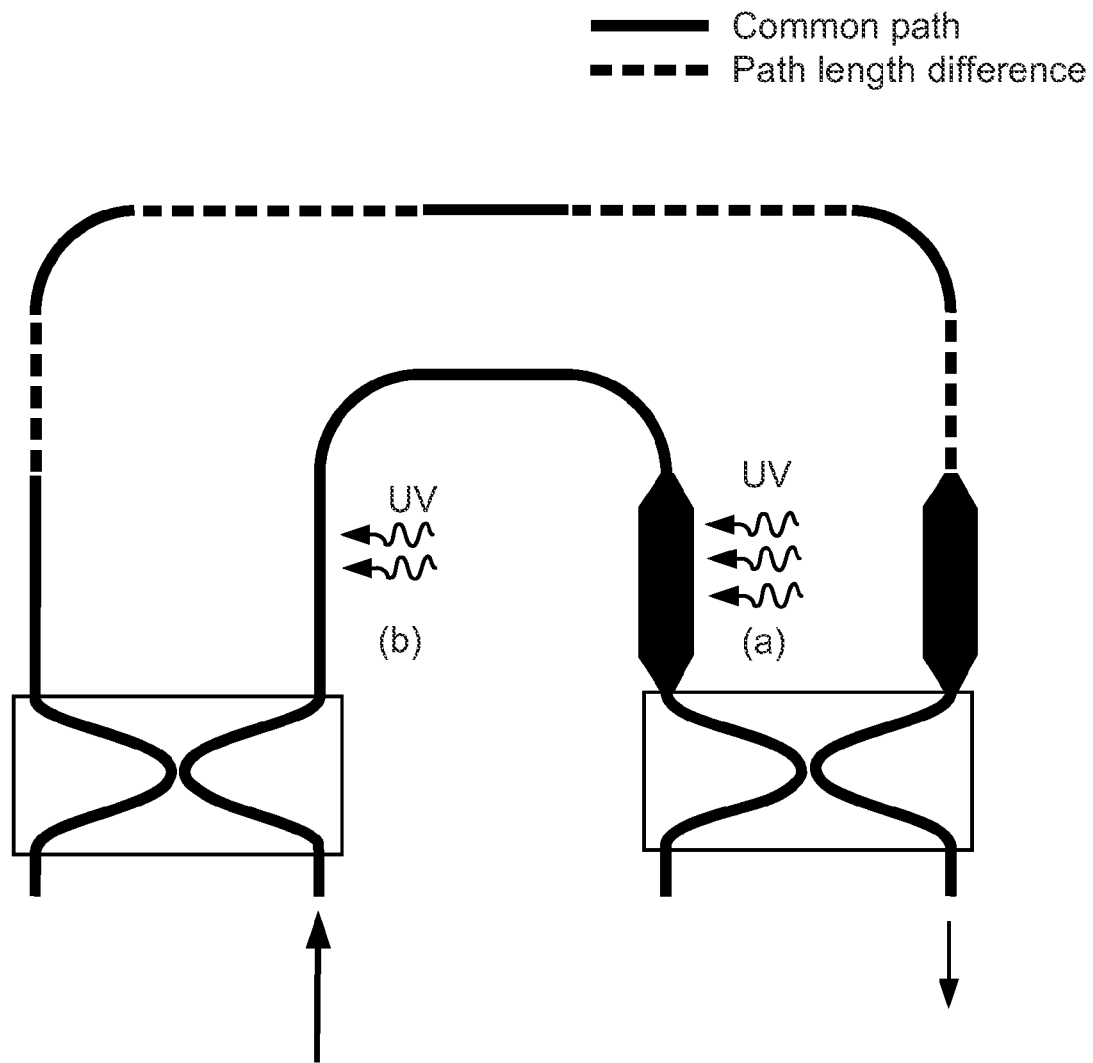

Unlike the trimming of the PDFSc described above, the trimming of PDFSd will induce a change in the frequency error. This is due to the differential nature of the trimming which induces a phase difference between the arms of the MZDI. The techniques described herein provide for the elimination of both the PDFSd and the frequency error simultaneously by applying a combination of UV trims in wide and narrow waveguide section to one or both arms of the MZI. FIG. 13 is an illustration of an example UV writing of equal amounts in the narrow waveguide sections of both arms, and FIG. 14 is an illustration of an example UV writing of equal amounts in the wide waveguide sections of both arms. FIGS. 15-20, 23 and 24 illustrate various examples of UV writing of the differential path. In particular:

FIG. 15 symbolizes writing in the narrow waveguide section of the upper path and writing of the same length in the wide waveguide section of the lower path, thereby producing a positive change in the differential birefringence PDFSd;

FIG. 16 symbolizes writing in the narrow waveguide section of the lower path and writing of the same length in the wide waveguide section of the upper path, thereby producing a negative change in the differential birefringence PDFSd;

FIG. 17 symbolizes writing in the narrow waveguide section of the lower path and writing of greater length in the wide waveguide section of the upper path;

FIG. 18 symbolizes writing in the narrow waveguide section of the upper path and writing of greater length in the wide waveguide section of the lower path;

FIG. 19 symbolizes writing in the narrow waveguide section of the upper path and also writing of optionally different length in the wide waveguide section of the same path;

FIG. 20 symbolizes writing in the narrow waveguide section of the lower path and also writing of optionally different length in the wide waveguide section of the same path.

Figure 21:
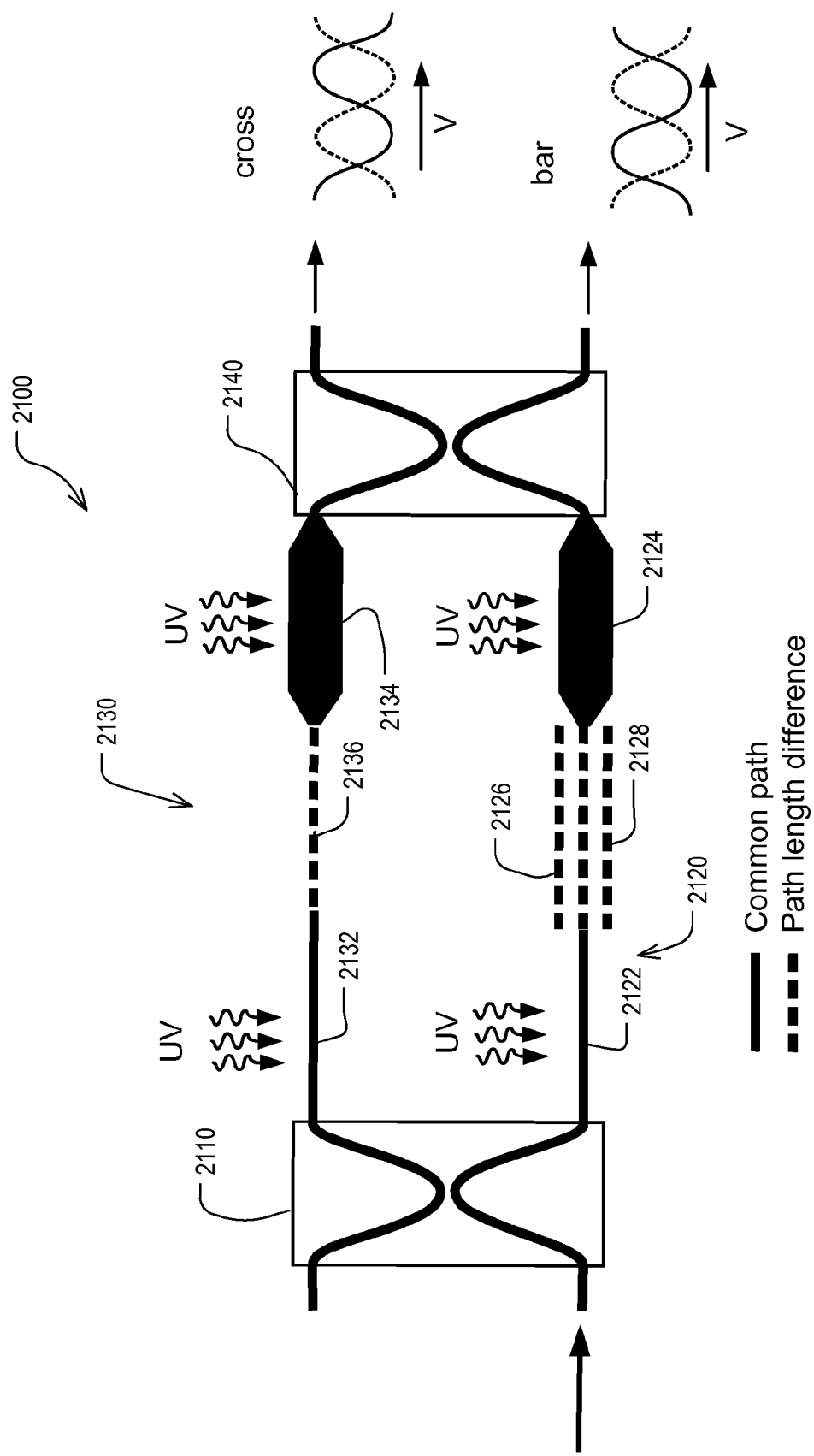
FIGS. 21 and 22 (consisting of FIGS. 22A-22E) illustrate layouts of polarization beam splitters incorporating features of the invention, showing various UV writing embodiments.

FIG. 21 symbolizes writing in the narrow waveguide section of the upper path and also writing in wide waveguide sections of both the upper and lower paths.

Figure 22A:
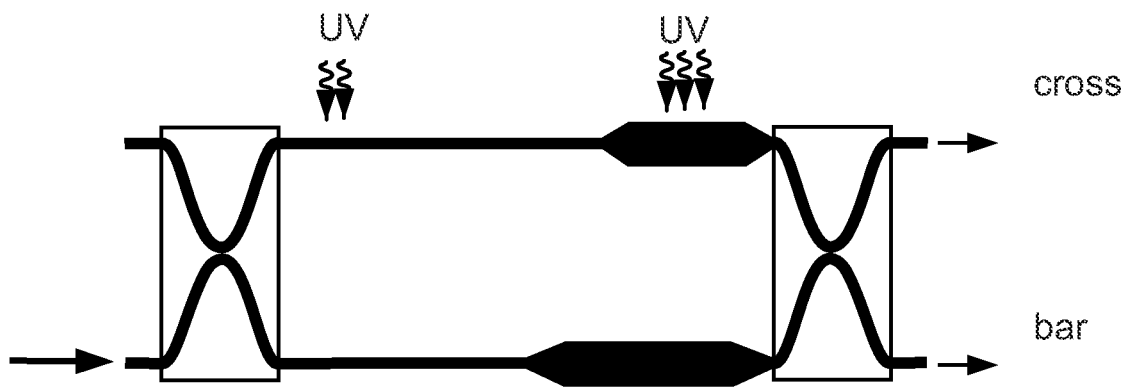

FIG. 22A symbolizes writing in the narrow waveguide section of the upper path and also writing of optionally different length in the wide waveguide section of the same path. The wide waveguide section of the lower path is longer than the wide waveguide section of the upper path.

Figure 22B:
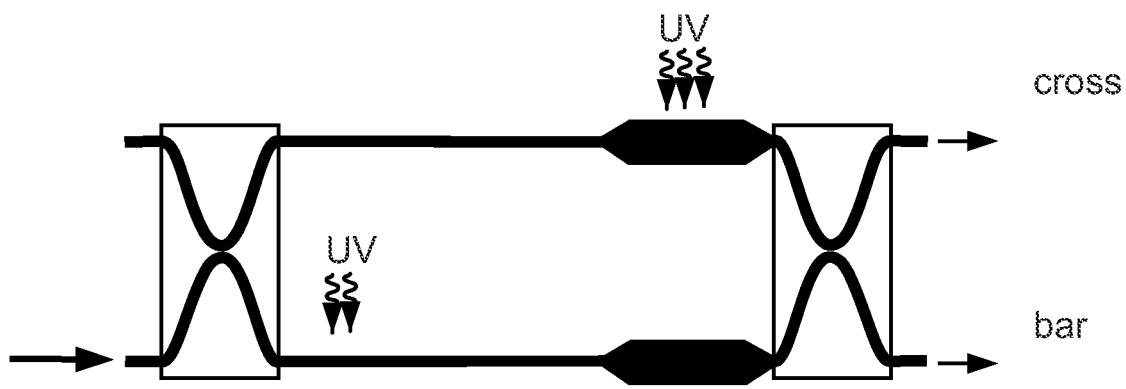

FIG. 22B symbolizes writing in the narrow waveguide section of the lower path and also writing of optionally different length in the wide waveguide section of the upper path.

Figure 22C:
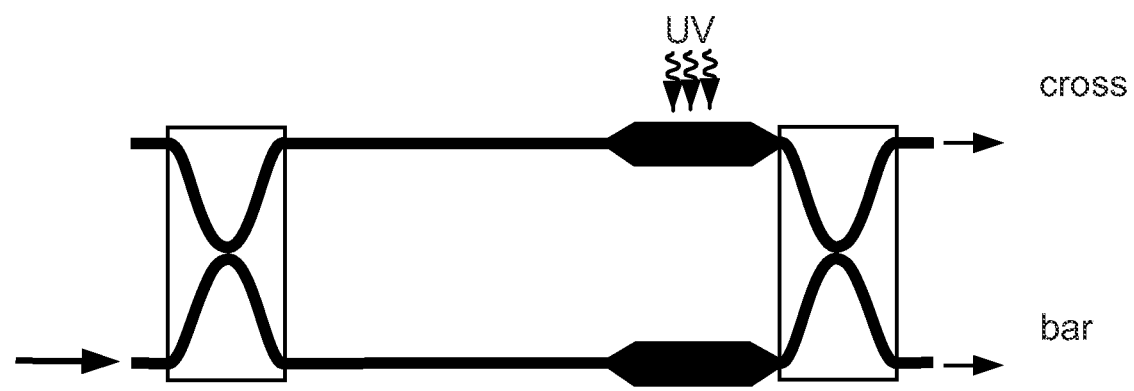

FIG. 22C symbolizes writing in only the wide waveguide section of the upper path.

The lower waveguide also has a wide waveguide section but it is not written in FIG. 22C.

Figure 22D:
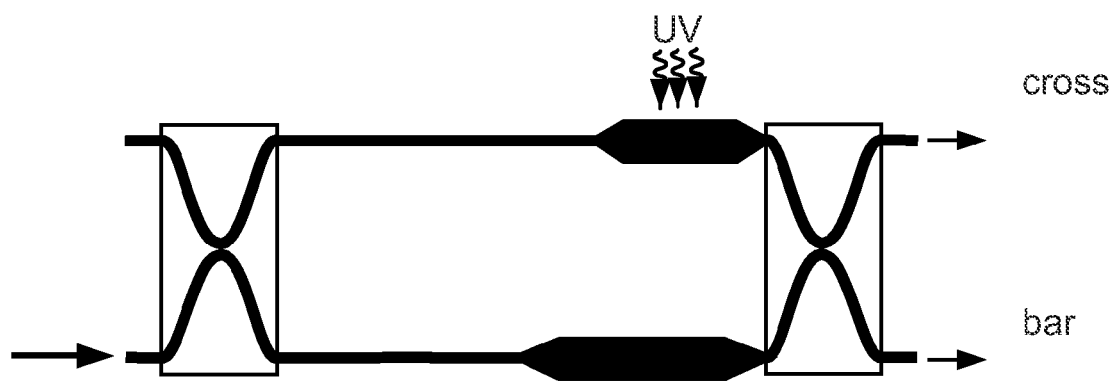

FIG. 22D is similar to FIG. 22C except the lower wide waveguide section is longer than the wide waveguide section of the upper path.

Figure 22E:
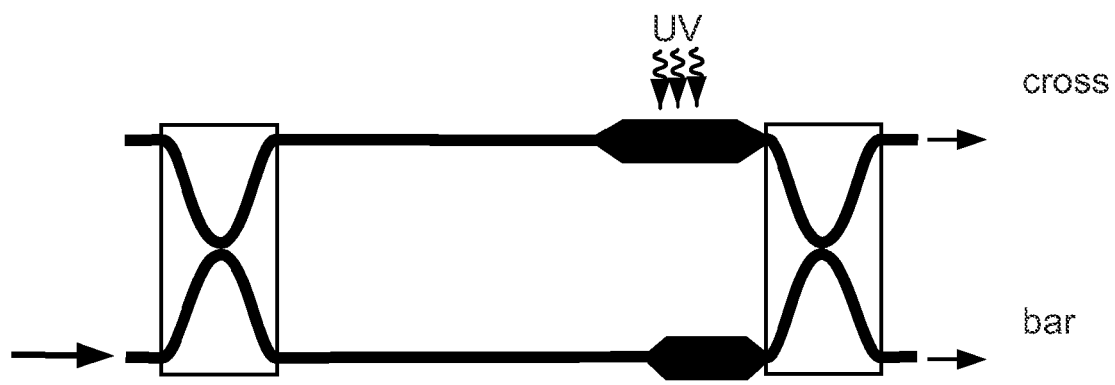

FIG. 22E is similar to FIG. 22C except the lower wide waveguide section is shorter than the wide waveguide section of the upper path.

Figure 23:
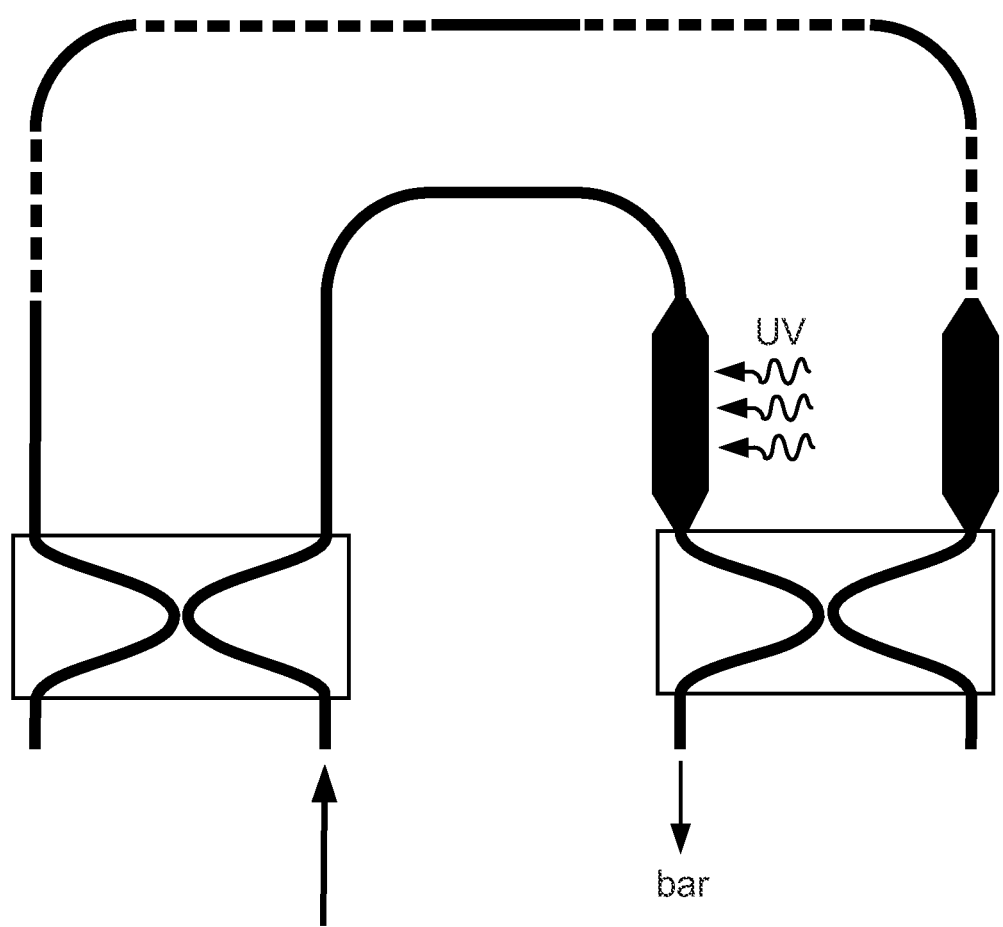

FIG. 23 symbolizes writing in the wide waveguide section of the lower path and no writing in the upper path.

Figure 24:
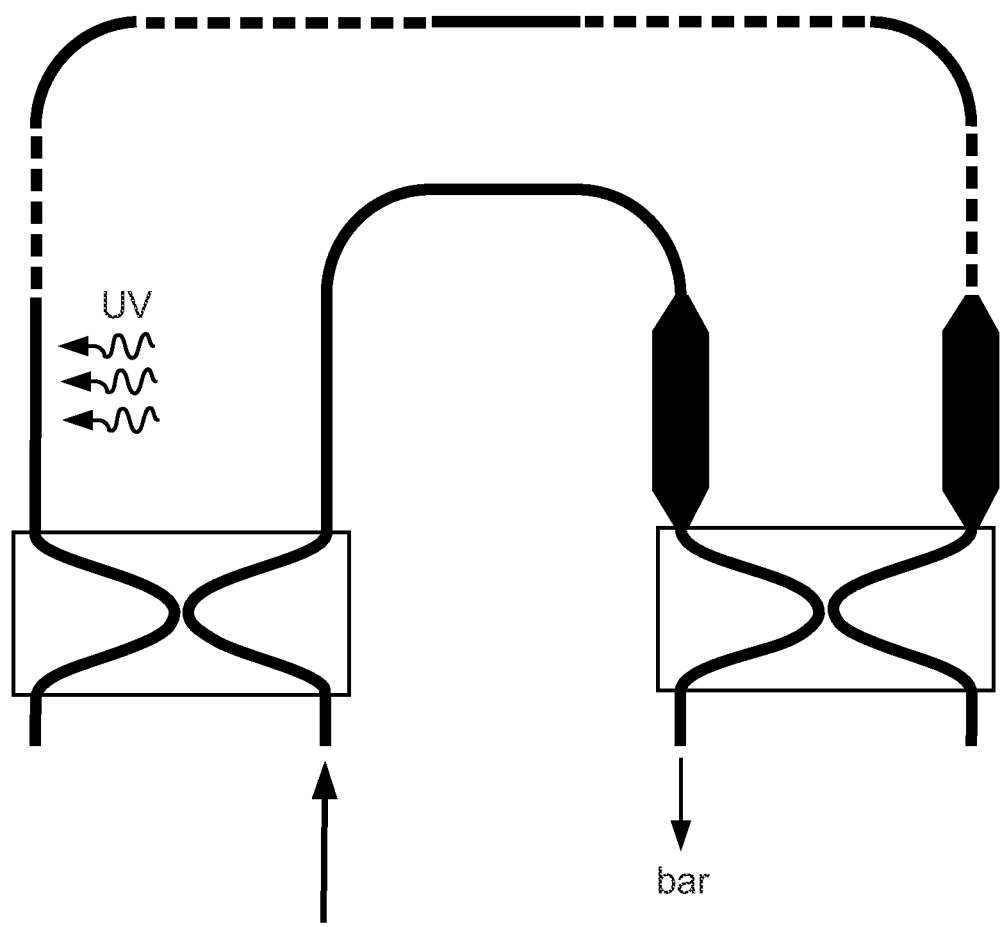

FIG. 24 symbolizes writing in the narrow waveguide section of the upper path and no writing in the lower path.

It will be understood that all permutations are possible for implementing various aspects of the invention, including any that are not illustrated explicitly in the drawings.

The trim lengths $h_a$ and $h_b$ required for a desired correction $\Delta\gamma$ in PDFSd and a desired correction $\Delta\phi$ in frequency error (FE) are given by the following expressions:

$$h_a = \frac{\Delta\gamma - \Delta\phi q_b}{(q_a - q_b)\Delta n_a} \cdot \frac{\lambda}{2\pi} \quad \text{(Eq. 17)}$$

$$h_b = \frac{-\Delta\gamma + \Delta\phi q_a}{(q_a - q_b)\Delta n_b} \cdot \frac{\lambda}{2\pi} \quad \text{(Eq. 18)}$$

where the suffixes a and b refer to the narrow and the wide waveguide sections respectively. For zero PDFSd and zero FE, one would substitute $\Delta\gamma = -$PDFSd and $\Delta\phi = -$FE. For trim lengths $h_a$ or $h_b$ having a positive sign, these are written in the upper branch. For trim lengths $h_a$ or $h_b$ having a negative sign, corrections of length $|h_a|$ or $|h_b|$, respectively, are written in the lower branch. Equations 17 and 18 above are derived from the following equations:

$$\Delta\phi = \frac{2\pi h_a \Delta n_a}{\lambda} + \frac{2\pi h_b \Delta n_b}{\lambda} \quad \text{(Eq. 18.1)}$$

$$\Delta\gamma = \frac{2\pi h_a q_a \Delta n_a}{\lambda} + \frac{2\pi h_b q_b \Delta n_b}{\lambda} \quad \text{(Eq. 18.2)}$$

where $\Delta\phi$ is the change in frequency error when the illuminations patterns having lengths $h_a$ and $h_b$ are written, and $\Delta\gamma$ is the change in PDFSd.

Thus using equations 17 and 18 one can apply a correction for both FE and PDFSd simultaneously. If equations 17 and 18 are used, then they would be used instead of eq. 12 or 12.1. Equations 17 and 18 do not correct for PDFSc, but as mentioned, correction for PDFSc is additive. So in general, to apply corrections for any or all the above errors, one would first calculate the writing lengths $h_2$ (from eq. 15) and $h_a$ and $h_b$ (from eqs. 17 and 18) for the correction amounts desired. One would then write a pattern of length $|h_a|$ and/or $|h_b|$ in the upper and/or lower path (depending on the signs of $h_a$ and $h_b$ as described above), plus a pattern of length $h_2$ into both paths.

In another variation, it will be appreciated that PDFSd can be trimmed using the techniques described herein without also trimming for frequency error (or without fully trimming for frequency error). In this case any desired further frequency error adjustment can be left to other means, such as a heater. Trimming for PDFSd alone can in fact be performed in only a single segment, rendering it unnecessary to provide more than one segment having different relationships between the effect that particular irradiation has on the index and the effect of such irradiation has on birefringence. In Eq. 18.2, this can be reflected by setting $\Delta n_b$ to zero (as no index change will occur in any second segment) and solving for $h_a$ as a function of the desired correction $\Delta\gamma$ in PDFSd:

$$h_a = \frac{\Delta\gamma}{q_a \Delta n_a} \cdot \frac{\lambda}{2\pi} \quad \text{(Eq. 18.3)}$$

In the above description, it will be understood that wherever the writing of a particular length h in a particular path is called for, the writing may be broken up into more than one segment. That is, the writing can be performed in multiple segments, contiguous or not, in lengths that together sum to h. In an embodiment, a trimming process is performed by first testing the birefringence properties of a manufactured device, calculating appropriate writing lengths $h_1$, $h_2$, $h_a$ and/or $h_b$, writing such lengths, then testing the resulting birefringence properties, calculating additional appropriate writing lengths $h_1$, $h_2$, $h_a$ and/or $h_b$, writing such lengths into different segments of the paths, and so on iteratively until the birefringence properties of the resulting device satisfy a goal. By writing iteratively into noncontiguous segments, there is no risk that a later writing step will undesirably slightly overlap an earlier writing step and thereby create an overlap region of unplanned birefringence.

In the above description, it is explained how to correct for both FE and PDFS simultaneously. In particular, embodiments made use of two degrees of freedom available in the trimming process: an amount of index change, and also an amount of birefringence change. But since irradiation in a path does not alter either of these two parameters independently, control of the two parameters is not achieved by simply trimming for the desired index change and then trimming for the desired birefringence change. Instead, access to the two degrees of freedom is achieved by making available two segments in each path for irradiation, the two segments having two different relationships between the effect that particular irradiation has on the index and the effect of such irradiation has on birefringence. Equations are developed above which can be used to calculate the length of irradiation that should be applied in each of the two kinds of segments, the same or different branches of an MZI, in order to achieve a desired change in FE and a desired change in PDFS.

These equations assume (1) that the relationship between the effect that particular irradiation has on the index and the effect of such irradiation has on birefringence is simply a multiplicative factor q ($q_a$ for one segment and $q_b$ for the other segment in the same branch), and (2) that these two values of q ($q_a$ and $q_b$) are the same for corresponding segments of the other path. It will be appreciated that neither of these assumptions are necessarily true in all embodiments, and a reader will be able to modify the equations appropriately for use in an embodiment in which one or the other assumption does not hold. For example, the relationship between the effect that particular irradiation has on the index and the effect of such irradiation has on birefringence is more generally described as a function $f(\Delta n)$, with functions $f_a(\Delta n_a)$ and $f_b(\Delta n_b)$ being applicable to the two segments respectively. These functions typically will reduce to simple multiplicative factors $q_a$ and $q_b$ only within some range of writing conditions. In addition, it will be appreciated further that some embodiments may include not two, but three or more segments in one or both branches which have mutually different relationships between the effect that particular irradiation has on the index and the effect of such irradiation has on birefringence (e.g. three or more different values of q).

It will be appreciated further that in some embodiments, the differences between $f_a(\Delta n_a)$ and $f_b(\Delta n_b)$ arises partially or entirely from differences in the irradiation setup, rather than any physical difference between waveguide segments on the chip. For example, without any difference between the construction of two different waveguide segments, the trimming process may write with higher power in one segment and lower power in another, or greater or lesser fluence, or writing speed, or any other characteristic of the irradiation setup. If two different irradiation setups write with two different sets of irradiation characteristics, then two different relationships can be achieved between the effect that particular irradiation has on the index and the effect of such irradiation has on birefringence. In such an embodiment, all the variations described elsewhere herein can be implemented without requiring any physical difference between waveguide segments on the chip. Hybrid arrangements are possible as well.

Polarization Beam Splitter

This section discusses the use of the above principles in the special case of a Polarization Beam Splitter (PBS). A PBS is essentially an MZI with $\gamma=(2i+1)\pi$ for some integer i. In addition, to minimize wavelength dependence, the relative phase difference $\phi$ should be as small as possible. Typically the arms are made with lengths which are as equal as possible. In a PBS, light with mixed polarization is presented at the input and is split in two orthogonal polarization states (ordinary and extraordinary) which are presented separated at the cross and the bar output ports.

An example of a polarization beam splitter 2100 incorporating features of the invention is illustrated in FIG. 21. It comprises a splitter 2110 at the input end, which splits incoming light into two outputs providing light to respectively an upper branch 2130 and a lower branch 2120. The upper branch has narrow and wide waveguide sections 2132 and 2134, respectively, and the lower branch has narrow and wide waveguide sections 2122 and 2124 respectively. The lower branch also includes a pair of dummy waveguides 2126 and 2128 on either side of a portion of narrow section 2122, which provides a built-in effective differential path relative to a corresponding portion 2136 in the narrow portion of the upper branch 2132. The purpose of providing a built-in effective differential path prior to UV trimming is to create a built-in effective path length difference which brings the PDFS of the device close to $(2i+1)\pi$. This can reduce the amount of correction needed through UV trimming. If the characteristics of the writing system are sufficient to provide that much of the PDFS can be brought close to $(2i+1)\pi$. Then the built-in differential path can be omitted. In glass technology, UV trimming allows for a large birefringence, which is even larger than can be achieved by conventional means. So for minimum footprint, the polarization dependent beam splitter preferably largely depends on UV trimming. Additional offsets and/or dynamic trimming mechanisms (such as a heater) may be added in one or the other branch as well. All the same variations are possible in PBS 2100 as set forth elsewhere herein regarding more general MZIs.

A PBS operates optimally when PDFS is equal to or very close to $(2i+1)\pi$. Any deviation from $(2i+1)\pi$ will result in polarization cross talk, where light of ordinary polarization appears at the extraordinary output and vice versa.

In (Eq. 8) $\gamma$ is substituted with $(2i+1)\pi+\gamma'$, which leads to the following equation for the PDFS:

$$PDFS=(2i+1)\pi+8\delta\rho^2+\gamma' \quad (Eq. 19)$$

Equations 18.1 and 18.2, with $\gamma'$ substituted for $\gamma$, are then used to calculate values for $h_a$ and $h_b$ as previously described. In particular, instead of substituting $\Delta\gamma=-PDFSd$ and $\Delta\phi=-FE$ into equations 18.1 and 18.2 to achieve zero PDFSd and zero FE as in an example above, one can substitute $\Delta\gamma=-(8\delta\rho^2+\gamma')$ and $\Delta\phi=-FE$ into equations 18.1 and 18.2 to achieve PDFSd=$\pi$ and zero FE.

It should be noted that by trimming for only the differential contribution ($\gamma'$) in this manner, it is possible to also offset the contribution from the coupler to the PDFS (PDFSc). Thus no common path correction ($h_2$) is required, thereby potentially obviating a writing step. On the other hand, in some embodiments common path correction can be implemented by writing in both branches, thereby reducing $\delta$, in which case the writing lengths $h_a$ and $h_b$ can be adjusted accordingly. It can be seen that embodiments exist in which writing is performed in both the narrow and wide sections of one of the branches and no writing in the other branch (FIG. 22A). Other embodiments exist in which writing is necessary in only the narrow section of one branch and the wide section of the other branch (FIG. 22B). Embodiments even exist in which writing is necessary in only one section of one of the branches (FIG. 22C, D, E).

In a Mach-Zehnder one wants to achieve a given optical path length difference between two branches. Due to processing this path length is typically off target. One can use UV trimming on the lower or upper branch to increase or decrease the path length of the upper and lower branch respectively. In addition, one would like to ensure that the path length difference is independent of the state of polarization of light. However, this is typically not the case in manufactured devices for the reasons discussed above.

The techniques described herein overcome these issues and achieve net zero birefringence (or a desired non-zero net birefringence) by appropriately combining UV trimming in regions with high induced birefringence and regions with low induced birefringence. Thus in the design of the Mach-Zehnder shown in FIG. 12 includes two types of waveguides having different geometries, one with high q and one with low q. Through the UV trimming in one or more of the four regions (narrow and wide waveguide regions in each of the upper and lower branches), the techniques described herein can either increase or decrease the FE as well as the PDFS. The difference between the two values of q should optimally be made as large as possible because this permits shorter writing lengths, thereby permitting devices occupying a smaller chip area.

In a real device making use of the concepts described herein, it will be appreciated that it may be either impossible or commercially unnecessary to match the equations set forth above exactly. For example, the devices may deviate from the equations due to manufacturing tolerances in the ability to irradiate the desired path lengths exactly or with assumed irradiation characteristics, or due to the use of simplified versions of the ideal equations. A real device which deviates from the equations set forth above for any of these reasons, is considered herein to satisfy the equations "substantially." Since such devices still make use of the novel concepts taught herein they can be made with much better accuracy than conventional devices, even though they do not satisfy the equations exactly.

In addition, whereas reduced polarization sensitivity can be optimized by using the equations and techniques described herein, an embodiment can still make great improvements over conventional methods if the equations described herein are satisfied only substantially, or satisfied but for a small spoiling factor. As used herein, the phrase "substantially" is also intended to accommodate such situations. It is not essential that the equations be exactly satisfied in order to obtain some benefits of the invention.

Whereas conventionally manufactured MZIs likely cannot produce a standard deviation for the polarization dependent frequency shift of less than about 2 GHz, the techniques described herein can enable the manufacturing of MZIs having a polarization dependent accuracy for the phase difference in the delay of less than or equal to 3 degrees. The techniques described herein provide improved optical performance, with no penalty in insertion loss and no extra mechanical manipulation required.

It will further be appreciated that the devices described herein can also be operated in reverse to perform the reverse function. In such a case what is described above as being an "input" would instead become an "output", and what is described herein as an "output" would instead become an "input".

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

As used herein, the term "segment" does not by itself imply a physical boundary. That is, one contiguous length of a waveguide can contain more than one "segment", and unless the segments are further stated to have different physical characteristics (such as one being narrow and the other wide), the boundary between them need not be physically detectable in any way.

Also as used herein, a given value is determined "in dependence upon" a predecessor value if the predecessor value influenced the given value. If there is an intervening processing step, the given value can still be determined "in dependence upon" the predecessor value. If the intervening processing step combines more than one value, the output of the processing step is considered dependent upon each of the value inputs. If the given value is the same as the predecessor value, this is merely a degenerate case in which the given value is still considered to be "in dependence upon" the predecessor value.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for manufacturing an optical device, the method comprising:
    forming on a substrate a set of at least one waveguide collectively having first and second segments,
    the first segment being constructed such that first irradiation of the first segment changes an average of refractive indices of extraordinary and ordinary optical axes in the first segment, and also changes birefringence in the first segment, the change in birefringence due to the first irradiation being a first non-zero function $f_a$ of the change in average refractive index due to the first irradiation,
    the second segment being constructed such that second irradiation of the second segment changes an average of refractive indices of extraordinary and ordinary optical axes in the second segment, and also changes birefringence in the second segment, the change in birefringence due to the second irradiation being a second non-zero function $f_b$ of the change in average refractive index due to the second irradiation,
    the first and second functions being different;
    irradiating a first predetermined length of the first segment with the first irradiation; and
    irradiating a second predetermined length of the second segment with the second irradiation.

2. A method according to claim 1, wherein the first function is $$f_a(\Delta n_a) = q_a \Delta n_a,$$

where $\Delta n_a$ is the change in average refractive index due to the first irradiation of the first segment,
and $q_a$ is a non-zero constant of proportionality for the first irradiation in the first segment.

3. A method according to claim 2, wherein the second function is $$f_b(\Delta n_b) = q_b \Delta n_b,$$

where $\Delta n_b$ is the change in average refractive index due to the second irradiation of the second segment,
$q_b$ is a non-zero constant of proportionality for the second irradiation in the second segment, and $q_a <> q_b$.

4. A method according to claim 1, wherein the first predetermined length is different from the second predetermined length.

5. A method according to claim 1, wherein the first and second segments are both on a single one of the waveguides.

6. A method according to claim 1, wherein the first and second segments are on two different waveguides in the set.

7. A method according to claim 1, wherein the set of waveguides includes first and second waveguides, the first waveguide having the first and second segments and the second waveguide having third and fourth segments,
    the third segment being constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$,
    the fourth segment being constructed such that fourth irradiation of the fourth segment changes an average of refractive indices of extraordinary and ordinary optical axes in the fourth segment, and also changes birefringence in the fourth segment, the change in birefringence due to the fourth irradiation being a fourth function of the change in average refractive index due to the fourth irradiation, the fourth function being substantially equal to the second function $f_b$.

8. A method according to claim 7, further comprising step of irradiating a third predetermined length of the third segment with the third irradiation.

9. A method according to claim 1, wherein the set of waveguides includes first and second waveguides collectively having the first and second segments, further comprising steps of:
    forming on the substrate an optical splitter having an input and first and second outputs; and
    forming on the substrate an optical combiner having first and second inputs and a first output, wherein the first waveguides carries light from the first output of the splitter to the first input of the combiner, and the second waveguides carries light from the second output of the splitter to the second input of the combiner.

10. A method according to claim 9, wherein the steps of irradiating the first predetermined length of the first segment with the first irradiation and irradiating the second predetermined length of the second segment with the second irradiation collectively are such that, after both steps of irradiating, light provided at the input of the splitter will appear at the first output of the combiner with a power loss that is substantially independent of polarization of the light.

11. A method according to claim 9, wherein the steps of irradiating the first predetermined length of the first segment with the first irradiation and irradiating the second predetermined length of the second segment with the second irradiation collectively are such that, after both steps of irradiating, if light of a particular wavelength provided at the input of the splitter includes first and second mutually orthogonal polarization states, the portion of the light having the first polarization state will appear at the first output of the combiner and the portion of the light having the second polarization state will not.

12. A method according to claim 9, further comprising the step of determining the first predetermined length in dependence upon a desired change in the operating frequency of the device.

13. A method according to claim 12, for use in processing light having a wavelength $\lambda$,
and wherein the step of determining the first predetermined length comprises the steps of:
determining a writing length $h_1$ given by $$h_1 = \frac{\lambda \Delta \phi}{2\pi \Delta n};$$

and
determining the first predetermined length in dependence upon $h_1$,
where $\Delta \phi$ is a desired change in relative phase delay between the first and second waveguides,
and $\Delta n$ is the change in average refractive index due to the first irradiation in the first segment.

14. A method according to claim 13, wherein prior to the step of irradiating the first predetermined length of the first segment with the first irradiation, the device has a frequency error FE,
and wherein the desired change $\Delta \phi$ is given by $\Delta \phi = -FE$.

15. A method according to claim 9, for use in processing light having a wavelength $\lambda$,
wherein the first predetermined length is substantially equal to $$h_1 = \frac{\lambda \Delta \phi}{2\pi \Delta n},$$

where $\Delta \phi$ is a desired change in relative phase delay between the first and second waveguides,
and $\Delta n$ is the change in average refractive index due to the first irradiation in the first segment.

16. A method according to claim 9, for use in processing light having a wavelength $\lambda$,
wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$,
further comprising steps of:
irradiating a third predetermined length of the third segment with the third irradiation,
determining a writing length $h_2$; and
determining the first and third predetermined lengths in dependence upon $h_2$,
where $$h_2 = -\frac{\delta - 2i\pi}{\Delta B} \cdot \frac{\lambda}{2\pi},$$

$$\delta = \frac{2\pi}{\lambda} B \cdot L,$$

B is the waveguide birefringence in the first segment prior to the step of irradiating the first predetermined length of the first segment, L is a common path length of the first and second waveguides, $\Delta B$ is the change in birefringence due to the first irradiation in the first segment, and i is any integer that yields $h_2 \geq 0$.

17. A method according to claim 16, further comprising a steps of:
determining a writing length $h_1$; and
determining the second predetermined length in dependence upon $h_1$,
where $$h_1 = \frac{\lambda \Delta \phi}{2\pi \Delta n},$$

$\Delta \phi$ is a desired change in relative phase delay between the first and second waveguides,
and $\Delta n$ is the change in average refractive index in the second segment due to the second irradiation in the second segment.

18. A method according to claim 9, for use in processing light having a wavelength $\lambda$,
wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$,
further comprising a step of irradiating a third predetermined length of the third segment with the third irradiation, wherein the first and third predetermined lengths are both substantially equal to $$h_2 = -\frac{\delta - 2i\pi}{\Delta B} \cdot \frac{\lambda}{2\pi},$$

and the second predetermined length is substantially equal to $|h_1|$, where $$h_1 = \frac{\lambda \Delta \phi}{2\pi \Delta n},$$
$$\delta = \frac{2\pi}{\lambda} B \cdot L,$$

B is the waveguide birefringence in the first segment prior to the step of irradiating the first predetermined length of the first segment, L is a common path length of the first and second waveguides, ΔB is the change in birefringence due to the first irradiation in the first segment, Δϕ is a desired change in relative phase delay between the first and second waveguides, Δn is the change in average refractive index in the second segment due to the second irradiation in the second segment, and i is any integer that yields $h_2 \geq 0$.

19. A method according to claim 9, for use in processing light having a wavelength λ, wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$, further comprising a step of irradiating a third predetermined length of the third segment with the third irradiation, wherein the first and third predetermined lengths are both substantially equal to $$h_2 = -\frac{\delta - 2i\pi}{\Delta B} \cdot \frac{\lambda}{2\pi}, \text{ where}$$

$$\delta = \frac{2\pi}{\lambda} B \cdot L,$$

B is the waveguide birefringence in the first segment prior to the step of irradiating the first predetermined length of the first segment, L is a common path length of the first and second waveguides, ΔB is the change in birefringence due to the first irradiation in the first segment, and i is any integer that yields $h_2 \geq 0$.

20. A method according to claim 9, for use in processing light having a wavelength λ, wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$, further comprising a step of irradiating a third predetermined length of the third segment with the third irradiation, wherein one of the first and third predetermined lengths is substantially equal to $|h_1|+h_2$ and the other of the first and third predetermined lengths is substantially equal to $h_2$, where $$h_1 = \frac{\lambda \Delta \phi}{2\pi \Delta n} \text{ and } h_2 = -\frac{\delta - 2i\pi}{\Delta B} \cdot \frac{\lambda}{2\pi},$$
$$\delta = \frac{2\pi}{\lambda} B \cdot L,$$

B is the waveguide birefringence in the first segment prior to the step of irradiating the first predetermined length of the first segment, L is a common path length of the first and second waveguides, Δn is the change in average refractive index due to the first irradiation in the first segment, ΔB is the change in birefringence due to the first irradiation in the first segment, Δϕ is a desired change in relative phase delay between the first and second waveguides, and i is any integer that yields $h_2 \geq 0$.

21. A method according to claim 9, for use in processing light having a wavelength λ, wherein the first function is $f_a(\Delta n_a) = q_a \Delta n_a$ and the second function is $f_b(\Delta n_b) = q_b \Delta n_b$, where $\Delta n_a$ is the change in average refractive index due to the first irradiation of the first segment, $\Delta n_b$ is the change in average refractive index due to the second irradiation of the second segment, and $q_a$ and $q_b$ are non-zero constants of proportionality for the irradiation in respectively the first and second segments, $q_a <> q_b$, the method further comprising the steps of:

determining values for writing lengths $|h_a|$ and $|h_b|$, $$h_a = \frac{\Delta \gamma - \Delta \phi q_b}{(q_a - q_b) \Delta n_a} \cdot \frac{\lambda}{2\pi} \text{ and } h_b = \frac{-\Delta \gamma + \Delta \phi q_a}{(q_a - q_b) \Delta n_b} \cdot \frac{\lambda}{2\pi},$$

where Δγ is a desired change in the birefringence-induced phase delay and Δϕ is a desired change in relative phase delay between the first and second waveguides, at least one of Δγ and Δϕ being non-zero;

determining the first predetermined length in dependence upon $|h_a|$; and determining the second predetermined length in dependence upon $|h_b|$.

22. A method according to claim 9, for use in processing light having a wavelength λ, wherein the first function is $f_a(\Delta n_a) = q_a \Delta n_a$ and the second function is $f_b(\Delta n_b) = q_b \Delta n_b$, where $\Delta n_a$ is the change in average refractive index due to the first irradiation of the first segment, $\Delta n_b$ is the change in average refractive index due to the second irradiation of the second segment, and $q_a$ and $q_b$ are non-zero constants of proportionality for the irradiation in respectively the first and second segments, $q_a <> q_b$, wherein the first and second predetermined lengths are substantially equal to $|h_a|$ and $|h_b|$, respectively, where $$h_a = \frac{\Delta\gamma - \Delta\phi q_b}{(q_a - q_b)\Delta n_a} \cdot \frac{\lambda}{2\pi} \text{ and } h_b = \frac{-\Delta\gamma + \Delta\phi q_a}{(q_a - q_b)\Delta n_b} \cdot \frac{\lambda}{2\pi},$$

where $\Delta\gamma$ is a desired change in the birefringence-induced phase delay and $\Delta\phi$ is a desired change in relative phase delay between the first and second waveguides, at least one of $\Delta\gamma$ and $\Delta\phi$ being non-zero.

23. A method according to claim 22, wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$, further comprising steps of:

irradiating a third predetermined length of the third segment with the third irradiation;
  determining a writing length $h_2$; and
  determining the third predetermined length in dependence upon $h_2$, wherein the step of determining the first predetermined length is performed further in dependence upon $h_2$, $$h_2 = -\frac{\delta - 2i\pi}{\Delta B} \cdot \frac{\lambda}{2\pi},$$

$$\delta = \frac{2\pi}{\lambda} B \cdot L,$$

B is the waveguide birefringence in the first segment prior to the step of irradiating the first predetermined length of the first segment, L is a common path length of the first and second waveguides, $\Delta B$ is the change in birefringence due to the first irradiation in the first segment, and $i$ is any integer that yields $h_2 \geq 0$.

24. A method according to claim 9, for use in processing light having a wavelength $\lambda$, wherein the first function is $f_a(\Delta n_a) = q_a \Delta n_a$ and the second function is $f_b(\Delta n_b) = q_b \Delta n_b$, where $\Delta n_a$ is the change in average refractive index due to the first irradiation of the first segment, $\Delta n_b$ is the change in average refractive index due to the second irradiation of the second segment, and $q_a$ and $q_b$ are non-zero constants of proportionality for the irradiation in respectively the first and second segments, $q_a <> q_b$, wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$, further comprising a step of irradiating a third predetermined length of the third segment with the third irradiation, wherein the third predetermined length is substantially equal to a writing length $h_2$, and wherein the first and second predetermined lengths are substantially equal to $h_2 + |h_a|$ and $|h_b|$, respectively, where $$h_a = \frac{\Delta\gamma - \Delta\phi q_b}{(q_a - q_b)\Delta n_a} \cdot \frac{\lambda}{2\pi},$$

$$h_b = \frac{-\Delta\gamma + \Delta\phi q_a}{(q_a - q_b)\Delta n_b} \cdot \frac{\lambda}{2\pi},$$

and $h_2 = -\frac{\delta - 2i\pi}{\Delta B} \cdot \frac{\lambda}{2\pi},$ where $\Delta\gamma$ is a desired change in the birefringence-induced phase delay, $\Delta\phi$ is a desired change in relative phase delay between the first and second waveguides, at least one of $\Delta\gamma$ and $\Delta\phi$ being non-zero, $$\delta = \frac{2\pi}{\lambda} B \cdot L,$$

B is the waveguide birefringence in the first segment prior to the step of irradiating the first predetermined length of the first segment, L is a common path length of the first and second waveguides, $\Delta B$ is the change in birefringence due to the first irradiation in the first segment, and $i$ is any integer that yields $h_2 \geq 0$.

25. A method according to claim 9, for use in processing light having a wavelength $\lambda$, wherein the first function is $f_a(\Delta n_a) = q_a \Delta n_a$ and the second function is $f_b(\Delta n_b) = q_b \Delta n_b$, where $\Delta n_a$ is the change in average refractive index due to the first irradiation of the first segment, $\Delta n_b$ is the change in average refractive index due to the second irradiation of the second segment, and $q_a$ and $q_b$ are constants of proportionality for the irradiation in respectively the first and second segments, $q_a <> q_b$, wherein the second waveguide has a third segment constructed such that third irradiation of the third segment changes an average of refractive indices of extraordinary and ordinary optical axes in the third segment, and also changes birefringence in the third segment, the change in birefringence due to the third irradiation being a third function of the change in average refractive index due to the third irradiation, the third function being substantially equal to the first function $f_a$, further comprising a step of irradiating a third predetermined length of the third segment with the third irradiation, wherein the third predetermined length is substantially equal to a writing length $h_2$, and wherein the first and second predetermined lengths are substantially equal to $|h_a|$ and $h_2+|h_b|$, respectively, $$h_a = \frac{\Delta\gamma - \Delta\phi q_b}{(q_a - q_b)\Delta n_a} \cdot \frac{\lambda}{2\pi},$$

$$h_b = \frac{-\Delta\gamma + \Delta\phi q_a}{(q_a - q_b)\Delta n_b} \cdot \frac{\lambda}{2\pi},$$

$$\text{and } h_2 = -\frac{\delta - 2i\pi}{\Delta B} \cdot \frac{\lambda}{2\pi},$$

where $\Delta\gamma$ is a desired change in the birefringence-induced phase delay,
$\Delta\phi$ is a desired change in relative phase delay between the first and second waveguides, at least one of $\Delta\gamma$ and $\Delta\phi$ being non-zero, $$\delta = \frac{2\pi}{\lambda} B \cdot L,$$

B is the waveguide birefringence in the first segment prior to the step of irradiating the first predetermined length of the first segment,
L is a common path length of the first and second waveguides,
$\Delta B$ is the change in birefringence due to the first irradiation in the first segment,
and i is any integer that yields $h_2 >= 0$.

26. A method according to claim 1, wherein the first segment comprises a plurality of noncontiguous sub-segments on a common one of the waveguides.

27. A method according to claim 1, wherein the step of irradiating a first predetermined length of the first segment with the first irradiation comprises the step of irradiating a plurality of noncontiguous sub-lengths of the of the first predetermined length.

28. A method according to claim 1, wherein the first irradiation has first irradiation characteristics and the second irradiation has second irradiation characteristics different from the first irradiation characteristics, the differences between the first and second functions being independent of the differences between the first and second irradiation characteristics.

29. A method for manufacturing an optical device, the method comprising:
forming on a substrate an optical splitter having an input and first and second outputs;
forming on the substrate an optical combiner having first and second inputs and a first output; and
forming on the substrate first and second waveguides collectively having first and second segments, the first waveguide carrying light from the first output of the splitter to the first input of the combiner, and the second waveguide carrying light from the second output of the splitter to the second input of the combiner,
wherein the first segment is constructed such that first irradiation of the first segment changes an average of refractive indices of extraordinary and ordinary optical axes in the first segment, and also changes birefringence in the first segment, the change in birefringence due to the first irradiation being a first non-zero function $f_a$ of the change in average refractive index due to the first irradiation,
wherein the second segment is constructed such that second irradiation of the second segment changes an average of refractive indices of extraordinary and ordinary optical axes in the second segment, and also changes birefringence in the second segment, the change in birefringence due to the second irradiation being a second non-zero function $f_b$ of the change in average refractive index due to the second irradiation,
the first and second functions being different;
the method further comprising a trimming step of irradiating either a first predetermined length of the first segment with the first irradiation or a second predetermined length of the second segment with the second irradiation or both,
the trimming step being such that, after the trimming step, if light of a particular wavelength provided at the input of the splitter includes first and second mutually orthogonal polarization states, the portion of the light having the first polarization state will appear at the first output of the combiner and the portion of the light having the second polarization state will not.

30. A method according to claim 29, wherein the optical combiner formed on the substrate further includes a second output,
and wherein the trimming step is further such that, after the trimming step, the portion of the light having the second polarization state will appear at the second output of the combiner and the light having the first polarization state will not.

31. A method for manufacturing an optical device, for use in processing light having a wavelength $\lambda$, the method comprising:
forming on a substrate an optical splitter having an input and first and second outputs;
forming on the substrate an optical combiner having first and second inputs and a first output; and
forming on the substrate first and second waveguides having respectively first and second segments, the first waveguide carrying light from the first output of the splitter through the first segment to the first input of the combiner, and the second waveguide carrying light from the second output of the splitter through the second segment to the second input of the combiner,
wherein the first and second segments are constructed such that first irradiation of each of the segments changes an average of refractive indices of extraordinary and ordinary optical axes in the respective segment, and also changes birefringence in the respective segment,
the method further comprising steps of:
determining a writing length $h_2$,
determining first and second predetermined lengths in dependence upon $h_2$;
irradiating the first predetermined length in the first segment; and
irradiating the second predetermined length in the second segment,
where $$h_2 = -\frac{\delta - 2i\pi}{\Delta B} \cdot \frac{\lambda}{2\pi},$$

$$\delta = \frac{2\pi}{\lambda} B \cdot L,$$

B is the waveguide birefringence in the first segment prior to the step of irradiating the first predetermined length of the first segment, L is a common path length of the first and second waveguides, ΔB is the change in birefringence due to the first irradiation in the first segment, and i is any integer that yields $h_2 >= 0$.

32. A method according to claim 31, comprising the step of determining the first predetermined length in further dependence upon a desired change in operating frequency of the device.

33. A method according to claim 31, further comprising the step of determining a writing length $|h_1|$, where $$h_1 = \frac{\lambda \Delta \phi}{2\pi \Delta n},$$

Δφ being a desired change in relative phase delay between the first and second waveguides and Δn being the change in average refractive index due to the first irradiation in the first segment, and wherein the step of determining the first predetermined length comprises the step of adding $|h_1|$ and $h_2$.

34. A method for manufacturing an optical device, for use in processing light having a wavelength λ, the method comprising:

forming on a substrate an optical splitter having an input and first and second outputs;

forming on the substrate an optical combiner having first and second inputs and a first output; and forming on the substrate first and second waveguides having respectively first and second segments, the first waveguide carrying light from the first output of the splitter through the first segment to the first input of the combiner, and the second waveguide carrying light from the second output of the splitter through the second segment to the second input of the combiner, wherein the first and second segments are constructed such that first irradiation of each of the segments changes an average of refractive indices of extraordinary and ordinary optical axes in the respective segment, and also changes birefringence in the respective segment, the method further comprising steps of:

irradiating the first predetermined length in the first segment; and irradiating the second predetermined length in the second segment, wherein the first and second predetermined lengths are both substantially equal to $$h_2 = -\frac{\delta - 2i\pi}{\Delta B} \cdot \frac{\lambda}{2\pi}, \text{ where}$$

$$\delta = \frac{2\pi}{\lambda} B \cdot L,$$

B is the waveguide birefringence in the first segment prior to the step of irradiating the first predetermined length of the first segment, L is a common path length of the first and second waveguides, ΔB is the change in birefringence due to the first irradiation in the first segment, and i is any integer that yields $h_2 >= 0$.

35. A method for manufacturing an optical device, for use in processing light having a wavelength λ, comprising the steps of:

forming on a substrate an optical splitter having an input and first and second outputs;

forming on the substrate an optical combiner having first and second inputs and a first output; and forming on the substrate first and second waveguides having respectively first and second segments, the first waveguide carrying light from the first output of the splitter through the first segment to the first input of the combiner, and the second waveguide carrying light from the second output of the splitter through the second segment to the second input of the combiner, wherein the first and second segments are constructed such that first irradiation of each of the segments changes an average of refractive indices of extraordinary and ordinary optical axes in the respective segment, and also changes birefringence in the respective segment, the method further comprising steps of:

irradiating the first predetermined length in the first segment; and irradiating the second predetermined length in the second segment, wherein one of the first and second predetermined lengths is substantially equal to $|h_1|+h_2$ and the other of the first and second predetermined lengths is substantially equal to $h_2$, where $$h_1 = \frac{\lambda \Delta \phi}{2\pi \Delta n} \text{ and } h_2 = -\frac{\delta - 2i\pi}{\Delta B} \cdot \frac{\lambda}{2\pi},$$

where Δφ is a desired change in relative phase delay between the first and second waveguides, Δn is the change in average refractive index due to the first irradiation in the first segment, $$\delta = \frac{2\pi}{\lambda} B \cdot L,$$

B is the waveguide birefringence in the first segment prior to the step of irradiating the first predetermined length of the first segment, L is a common path length of the first and second waveguides, ΔB is the change in birefringence due to the first irradiation in the first segment, and i is any integer that yields $h_2 >= 0$.

36. A method for manufacturing an optical device, for use in processing light having a wavelength λ, the method comprising:

forming on a substrate an optical splitter having an input and first and second outputs;

forming on the substrate an optical combiner having first and second inputs and a first output;

forming on the substrate a first waveguide carrying light from the first output of the splitter to the first input of the combiner, the first waveguide having a first segment constructed such that first irradiation of the first segment changes an average of refractive indices of extraordinary and ordinary optical axes in the first segment, and also changes birefringence in the first segment, the change in birefringence due to the first irradiation being $q_a \Delta n_a$, where $\Delta n_a$ is the change in average refractive index due to the first irradiation of the first segment, and $q_a$ is a constant of proportionality for the first irradiation in the first segment;

forming on the substrate a second waveguide carrying light from the second output of the splitter to the second input of the combiner;

determining a writing length $h_a$ given by $$h_a = \frac{\Delta\gamma}{q_a \Delta n_a} \cdot \frac{\lambda}{2\pi};$$

determining a first predetermined length in dependence upon $h_a$; and irradiating the first predetermined length of the first segment with the first irradiation, where $\Delta\gamma$ is a desired change in polarization dependent path length difference between the first and second waveguides.

37. A method according to any of claims 1, 29, 31, 34 and 35, wherein the step of irradiating the first predetermined length comprises a step of illuminating the first predetermined length with UV light, and wherein the step of irradiating the second predetermined length comprises a step of illuminating the second predetermined length with UV light.

38. An optical device comprising:

an optical splitter having an input port and first and second output ports;

an optical combiner having first and second input ports and a first output port;

a first optical path from the first output port of the splitter to the first input port of the combiner, the first optical path having at least two segments;

a second optical path from the second output port of the splitter to the second input port of the combiner, the second optical path having at least two segments, wherein a first one of the segments is constructed such that irradiation of the first segment changes an average of refractive indices of extraordinary and ordinary optical axes in the first segment, and also changes birefringence in the first segment, the change in birefringence being a first non-zero function of the change in average refractive index, wherein a second one of the segments is constructed such that irradiation of the second segment changes an average of refractive indices of extraordinary and ordinary optical axes in the second segment, and also changes birefringence in the second segment, the change in birefringence being a second non-zero function of the change in average refractive index, and wherein the first and second functions are different.

39. A device according to claim 38, wherein irradiation in the first segment changes the birefringence in the first segment by a non-zero factor $q_a$ times the amount by which the average of refractive indices of extraordinary and ordinary optical axes in the first segment changes, wherein irradiation in the second segment changes the birefringence in the second segment by a non-zero factor $q_b$ times the amount by which the average of refractive indices of extraordinary and ordinary optical axes in the second segment changes, and wherein $q_a <> q_b$.

40. A device according to claim 38, wherein the second optical path includes third and fourth segments having respectively third and fourth different birefringence irradiation dependencies.

41. A device according to claim 40, wherein the first and third birefringence irradiation dependencies are equal, and the second and fourth birefringence irradiation dependencies are equal.

42. A device according to claim 41, wherein irradiation in the first segment changes the birefringence in the first segment by a non-zero factor $q_a$ times the amount by which the average of refractive indices of extraordinary and ordinary optical axes in the first segment changes, wherein irradiation in the third segment changes the birefringence in the third segment by a non-zero factor $q_c$ times the amount by which the average of refractive indices of extraordinary and ordinary optical axes in the third segment changes, wherein irradiation in the fourth segment changes the birefringence in the fourth segment by a factor $q_d$ times the amount by which the average of refractive indices of extraordinary and ordinary optical axes in the fourth segment changes, wherein $q_a = q_c$, $q_b = q_d$, and $q_a <> q_b$.

43. A device according to claim 38, wherein the combiner further includes a second output port.

44. A device according to claim 38, wherein the first and second different birefringence irradiation dependencies comprise first and second different birefringence UV illumination dependencies.

45. A product made by the process of any of claims 1, 9, 29, 31, 34, 35 and 36.

* * * * *

UNITED STATES PATENT AND TRADEMARK OFFICE
CERTIFICATE OF CORRECTION

PATENT NO. : 8,824,056 B2  
APPLICATION NO. : 13/432782  
DATED : September 2, 2014  
INVENTOR(S) : Hindrik F. Bulthuis et al.

Page 1 of 1

It is certified that error appears in the above-identified patent and that said Letters Patent is hereby corrected as shown below:

In the Claims

Column 22, claim 21, before the equation at lines 46-51, insert --where--;

Column 23, claim 23, before the equation at lines 35-39, insert --where--;

Column 24, claim 24, line 23, replace "$\neq$" with --$\Delta$--; and

Column 25, claim 25, before the equation at lines 3-10, insert --where--.

Signed and Sealed this  
Eleventh Day of November, 2014

Michelle K. Lee  
*Deputy Director of the United States Patent and Trademark Office*